(12) United States Patent
McCann et al.

(10) Patent No.: US 6,647,113 B2
(45) Date of Patent: Nov. 11, 2003

(54) METHODS AND SYSTEMS FOR PROVIDING UNIVERSAL TRIGGERLESS NUMBER PORTABILITY

(75) Inventors: Thomas Matthew McCann, Morrisville, NC (US); Rick L. Allison, Holly Springs, NC (US)

(73) Assignee: Tekelec, Calabasas, CA (US)

( * ) Notice: Subject to any disclaimer, the term of this patent is extended or adjusted under 35 U.S.C. 154(b) by 0 days.

(21) Appl. No.: 09/823,061

(22) Filed: Mar. 30, 2001

(65) Prior Publication Data

US 2001/0040957 A1 Nov. 15, 2001

Related U.S. Application Data

(60) Provisional application No. 60/203,223, filed on May 5, 2000.

(51) Int. Cl.[7] .................................... H04M 7/00
(52) U.S. Cl. ..................... 379/221.13; 379/221.14; 379/229
(58) Field of Search ................. 379/221.13, 207.02, 379/201.01, 219, 220.01, 221.08, 221.09, 221.1, 221.12, 221.14, 229, 230

(56) References Cited

U.S. PATENT DOCUMENTS

| | | | |
|---|---|---|---|
| 4,754,479 A | 6/1988 | Bicknell et al. | |
| 5,546,398 A | 8/1996 | Tucker et al. | |
| 5,550,914 A | 8/1996 | Clarke et al. | |
| 5,572,579 A | 11/1996 | Orriss et al. | |
| 5,583,926 A | 12/1996 | Venier et al. | |
| 5,586,177 A | 12/1996 | Farris et al. | |
| 5,598,464 A | 1/1997 | Hess et al. | |
| 5,602,909 A | 2/1997 | Carkner et al. | |
| 5,610,977 A | 3/1997 | Williams et al. | |
| 5,625,681 A | 4/1997 | Butler, II | |
| 5,689,555 A | 11/1997 | Sonnenberg | |
| 5,696,816 A | 12/1997 | Sonnenberg | |
| 5,711,284 A | 1/1998 | Keenan, Jr. | |
| 5,740,239 A | 4/1998 | Bhagat et al. | |
| 5,764,745 A | 6/1998 | Chan et al. | |
| 5,768,358 A | 6/1998 | Venier et al. | |
| 5,949,871 A | 9/1999 | Kabay et al. | |
| 6,021,126 A | 2/2000 | White et al. | |
| 6,108,332 A | 8/2000 | Kasiviswanathan | |
| 6,128,377 A | 10/2000 | Sonnenberg | |
| 6,134,316 A | 10/2000 | Kallioniemi et al. | |
| 6,138,023 A | 10/2000 | Agarwal et al. | |
| 6,438,223 B1 | 8/2002 | Eskafi et al. | |
| 6,456,708 B1 * | 9/2002 | Copley et al. | 379/207.02 |

FOREIGN PATENT DOCUMENTS

| | | |
|---|---|---|
| EP | 1 100 279 A2 | 5/2001 |
| WO | WO 97/33441 | 9/1997 |
| WO | WO 97/42776 A2 | 11/1997 |
| WO | WO 99/25130 A1 | 5/1999 |
| WO | WO 00/16583 | 3/2000 |
| WO | WO 00/76134 A1 | 12/2000 |

OTHER PUBLICATIONS

Chris Goldman, "Chasing WINP," Wireless Review, pp. 14–16, 18–21, (Aug. 15, 2000).

(List continued on next page.)

Primary Examiner—Creighton Smith
(74) Attorney, Agent, or Firm—Jenkins, Wilson & Taylor, P.A.

(57) ABSTRACT

A universal triggerless number portability routing node receives a first call setup message from an end office. The triggerless number portability routing node may examine a first routing number (RN) value contained in the first call setup message to determine whether the first RN is a home RN value. If the first RN is determined to be a home RN value, a number portability database lookup is performed based on the called party dialed number. Once a number portability lookup is performed, the call setup message is modified to include a second RN value returned by the NP database, and the modified call setup message is routed to a destination node, which may be a tandem gateway or an end office/mobile switching center.

51 Claims, 14 Drawing Sheets

OTHER PUBLICATIONS

Anonymous, "Isn't it Ironic...", Supplement to America's Network, pp. S5–S7. (Publication date unknown).

Anonymous, "The ABC's of LNP", Supplement to America's Network, pp. S3–S4. (Publication date unknown).

"Packet–Based Multimedia Communications Systems", International Telecommunication Union, H.323 (Nov. 2000).

"Call signalling protocols and media stream packetization for packet–based multimedia communication systems", International Telecommunication Union, H.225.0 (Nov. 2000).

"Control protocol for multimedia communication", International Telecommunication Union, H.245, (Nov. 2000).

Eagle, "Feature Guide Eagle STP", Tekelec, Inc., pp. i–vi, 1–208, (Jan. 1998).

G. Sidebottom et al., "Signaling System 7 (SS7) Message Transfer Part 3 (MTP3) –User Adaptation Layer (M3UA)", The Internet Society, pp. 1–106, (2002).

R. Stewart, "Stream Control Transmission Protocol", The Internet Society, pp. 1–118, (2000).

D. Sprague, "Tekelec's Transport Adapter Layer Interface", The Internet Society, pp. 1–93, (2001).

M. Handley, "SIP: Session Initiation Protocol", The Internet Society, pp. 1–134, (1999).

J. Moy, "OSPF Version 2", The Internet Society, pp. 1–191, (1998).

K. Morneault et al., "Signaling System 7 (SS7) Message Transfer Part 2 (MTP2) –User Adaptation Layer", pp. 1–83, (2002).

"IP7 Secure Gateway Release 1.0", Tekelec, (Nov. 1999).

"Feature Guide LNP LSMS", Tekelec, (Jan. 1998).

* cited by examiner

HOME RN DATABASE — 346

| KEY | DATA FIELDS |
|---|---|
| RN — 380 | HOME — 382 |
| 9194605500 | NO |
| 9193450001 | YES |
| 7704545731 | NO |
| 2125662322 | NO |
| 9193450000 | YES |

NP DATABASE — 348

| KEY | DATA FIELDS | | |
|---|---|---|---|
| DIALED NUMBER — 384 | RN — 386 | NOA — 388 | NPFI — 390 |
| 9194675500 | 9194690000 | 126 = PORTED | OFF |
| 2123675637 | 2023211234 | 126 = PORTED | OFF |
| 7704545731 | -- | 125 = NOT PORTED | OFF |
| 2125662322 | 1013211234 | 126 = PORTED | OFF |

Fig. 5

| FIELD | M1 | M2 |
|---|---|---|
| OPC | 1-1-0 | 1-1-0 |
| DPC | 1-1-1 | 1-1-1 |
| SIO | 'ISUP' | 'ISUP' |
| CgPA:DN | 9194671234 | 9194671234 |
| CdPA:DN | 9194675500 | 919469000919467500 |
| CdPA:NPFI | NOT INCLUDED | NOT INCLUDED |
| CdPA:NOA | 'NATIONAL' = 3 | 'PORTED' = 126 |

- 600 — OPC
- 602 — DPC
- 604 — SIO
- 606 — CgPA:DN
- 608 — CdPA:DN
- 610 — CdPA:NPFI
- 612 — CdPA:NOA

Fig. 8

| FIELD | M3 | M4 | M5 |
|---|---|---|---|
| OPC | 1-1-1 | 1-1-1 | 2-1-1 |
| DPC | 2-1-1 | 2-1-1 | 2-1-2 |
| SIO | 'ISUP' | 'ISUP' | 'ISUP' |
| CgPA:DN | 9194671234 | 9194671234 | 9194671234 |
| CdPA:DN | 919469000919467500 | 919469000919467500 | 919469000919467500 |
| CdPA:NPFI | NOT INCLUDED | NOT INCLUDED | NOT INCLUDED |
| CdPA:NOA | 'PORTED' = 126 | 'PORTED' = 126 | 'PORTED' = 126 |

Fig. 9

HOME RN DATABASE — 700

| KEY | DATA FIELDS |
|---|---|
| RN | HOME — 704 |
| 9194690000 | YES |
| 2123675637 | NO |
| 7704545731 | NO |
| 9194690001 | YES |
| 9194690002 | YES |
| 9194690003 | YES |

702

NP DATABASE — 710

| KEY | DATA FIELDS | | |
|---|---|---|---|
| DIALED NUMBER | RN — 714 | NOA — 716 | NPFI — 718 |
| 9194675500 | 9194690001 | 126 = PORTED | OFF |
| 2143455637 | 2023211234 | 126 = PORTED | OFF |
| 6604534731 | -- | 125 = NOT PORTED | OFF |
| 7125872323 | 1013211234 | 126 = PORTED | OFF |

METHODS AND SYSTEMS FOR PROVIDING UNIVERSAL TRIGGERLESS NUMBER PORTABILITY

RELATION APPLICATION INFORMATION

This application claims the benefit of U.S. Provisional Patent Application No. 60/203,223, filed May 5, 2000, the disclosure of which is incorporated herein by reference in its entirety.

TECHNICAL FIELD

The present invention relates to methods and systems for providing number portability in a communications network. More particularly, the present invention relates to a universal number portability routing node for providing number portability in a communications network.

BACKGROUND ART

Number portability (NP) gives telephone service subscribers the ability to change service providers without changing their directory numbers. More specifically, the generic term NP is actually representative of three basic number porting scenarios: service provider portability, which allows subscribers to change service providers without changing their phone numbers; service portability, which allows subscribers to change from one type of service to another (e.g., analog to integrated services digital network (ISDN) without changing their phone numbers; and geographic portability, which allows subscribers to move from one physical location to another without changing their phone numbers.

In the current, non-NP environment, a telephone number performs two basic functions: it identifies the customer, and it provides the network with information necessary to route a call to that customer. Number portability solutions separate these two functions, thereby providing the means for customers to keep the same directory number when changing service providers.

By separating customer identification from call routing, NP gives customers the flexibility to respond to pricing and service changes offered by rival carriers. Accordingly, it is anticipated that NP will promote local-exchange competition, which in turn will benefit all customers, as has already been the case with the long-distance market. As NP solutions are implemented, competition in the local-exchange market is expected to drive down the cost of service, encourage technological innovation, stimulate demand for telecommunications services, and boost economic growth.

A number of interim number-portability methods, such as remote call forwarding and direct inward dialing exist today. However, these methods have several disadvantages: longer call set-up times, increased potential for call blocking, continued reliance on the incumbent local exchange carrier's (LEC's) network, loss of feature functionality, as well as substantial on-going costs to the new local service provider. Among the more long-term NP solution approaches currently being offered, triggered NP technology is the most relevant to a discussion of the present invention.

Triggered NP Solutions

Triggered NP solutions, as indicated by the name, require that both the "new" and "old" service providers implement a trigger function in their respective end offices. The "old" service provider switch (often referred to as the donor switch) administers an NP trigger on the ported subscriber's directory number. When activated, this trigger causes the end office switch to formulate an NP query that is subsequently launched into the SS7 network. This NP query is ultimately delivered to an NP database that contains information related to service provider associated with the dialed number. More particularly, the NP database performs a lookup based on a portion of the called party dialed digits. A location routing number or routing number (RN) is returned by the NP database. The routing number identifies the end office of the service provider currently serving the called party. The RN value is then sent back to the end office that originated the NP query. Upon receipt of the RN containing message, the originating end office proceeds with call setup operations using the RN as a destination address for all subsequent messages associated with the call.

Shown in FIG. 1 is an example of a telecommunications network generally indicated by reference numeral 100 that employs a triggered NP solution similar to that described above. Telecommunications network 100 includes an originating end office (EO) 110, a recipient terminating EO 112, a donor terminating EO 113, a tandem switching office 114, a signal transfer point (STP) 116, a service control point (SCP) based NP database 118, a calling party 120, and a called party 122. In this example, it is assumed that called party 122 has had local phone service ported from a service provider that owns EO 113 to a service provider that owns EO 112. Consequently, it is implied that the service responsibility for called party 122 was transferred from the donor EO 113 to the recipient EO 112 at some point in the past. As such, EO 112 is now assumed to service called party 122.

As such, FIG. 1 illustrates a simplified signaling message flow sequence associated with the setup of a call from calling party 120 to called party 122. When calling party 120 goes off-hook and dials the telephone number associated with called party 122, originating EO 110 analyzes the dialed digits and recognizes that the dialed number falls within an exchange that contains ported subscribers. Consequently, the originating EO 110 formulates an NP query message M1 and sends this query message to the STP 116. Those skilled in the art of SS7 telecommunication networks will appreciate that such NP queries and responses are typically in the form of transaction capabilities application part (TCAP) protocol signaling messages. As the TCAP protocol is well known and widely employed in the communication networks presently contemplated, a detailed discussion of the TCAP signaling protocol is not included herein. A detailed discussion of SS7 TCAP signaling message structures and their associated function can be found in Signaling System #7 by Travis Russell, McGraw-Hill Publishing 1998.

Returning now to the message flow shown in FIG. 1, NP query message M1 is received by STP 116 and subsequently routed to SCP-NP database node 118 as NP query message M2. The NP query message M2 is processed by SCP-NP database node 118, and an NP response message M3 is formulated and sent back to STP 116. It should be appreciated that NP response message M3 contains an RN associated with recipient EO 112, which is the EO currently servicing Called Party 122. Tandem office 114 is particularly significant from a call setup standpoint, in that a voice trunk connection through tandem 114 will ultimately be required in order to establish a voice circuit with terminating EO 112 that is currently serving the called party 122. NP response message M3 is received by the STP 116 and subsequently routed to the originating EO 110, as NP response message M4. The originating EO 110 processes NP response message M4, and uses the RN information contained therein to formulate and send a call setup message M5. Once again, those skilled in the art of SS7 telecommunication networks will appreciate that such call setup messages are typically of ISDN user part (ISUP) format, and as the ISUP signaling protocol is well known and widely employed in the telecommunications industry, a detailed explanation of this protocol is not provided herein. Once again, the abovementioned text, Signaling System #7, by Travis Russell, provides a detailed explanation of the ISUP signaling protocol.

Returning to FIG. 1, STP 116 receives message M5 and subsequently message transfer part (MTP) routes the message to tandem office 114 as message M6. Tandem office 114 examines and processes the message and formulates a message M7. Message M7 is sent to STP 116, which in turn MTP routes the message to terminating EO 112 as message M8. Those skilled in the art of telecommunications network operations will appreciate that additional call setup messages, not shown in FIG. 1, may be necessary to administer a complete a telephone call between the calling party 120 and the called party 122. The signaling message flow shown in FIG. 1 is intended only to generally illustrate a conventional NP translation process. As these additional signaling messages are not particularly relevant to the design and operation of the present invention, a detailed discussion of call setup and teardown procedures in an SS7 telecommunications network is not provided herein.

While the approach described above is functionally capable of providing network operators with number portability translation service, this approach necessarily requires that an originating end office switch have the ability to trigger an NP query and to interpret the subsequent NP response. In practice, this means that an originating end office switch must be capable of generating and launching an NP query message into the signaling network. As such, this also implies that an originating end office switch has the ability to receive and process NP response messages that are generated by service nodes within the signaling network.

Non-Standard Number Portability Specifiers

In addition to the problems associated with trigger-based number portability solutions, another problem associated with providing number portability service is that different countries and telecommunications standards organizations specify different parameters for storing number portability status information. For example, International Telecommunications Union (ITU) Recommendation Q.769.1, ISDN User Part Enhancements for the Support of Number Portability, December 1999, specifies a number portability forward information (NPFI) parameter for storing number portability status information. However, since this parameter is optional, some countries do not use this parameter to store number portability status information. In such countries, number portability status information may be stored in other fields of a call signaling message. For example, in Spain, the nature of address (NOA) parameter is used to store number portability status information. In light of these and other parameters for storing number portability status information, there is no universal method for determining whether number portability processing is required.

In light of these and other difficulties with conventional number portability solutions, there exists a need for scalable methods and systems for providing universal number portability. Such methods and systems preferably combine the aspects of not requiring an end office trigger with the ability to process non-standard number portability specifiers.

DISCLOSURE OF THE INVENTION

A triggerless number portability (TNP) routing node includes a communication module for receiving a message from an end office over a communications network. A gateway screening (GWS) process determines that the message is a call setup message, and in response to determining that the message is a call setup message, forwards the call setup message over a communications bus for further processing. A number portability (NP) database contains routing numbers (RNs) for SS7 signaling points associated with ported subscribers. A universal portability module (UPM) receives the message from the communications bus, extracts the called party address from the message, examines a number of parameters contained within the message, and, based on one or more of these message parameter values, may perform a lookup in the NP database using the called party address to obtain an RN. In the event that an RN is returned from the NP database, the message is modified to include the RN and subsequently routed. If a call setup message is received which has already obtained an NP translation, a TNP routing node of the present invention is adapted to perform an additional number portability translation in the event that the RN contained within the message is associated with a gateway signaling point (i.e. tandem switch) that is in the home network of the TNP routing node, as opposed to a signaling end point (i.e., an end office or mobile switching center).

Accordingly, it is an object of the present invention to provide a triggerless number portability (TNP) routing node capable of analyzing a variety of fields in a call setup message in order to determine the need for a number portability (NP) translation.

It is another object of the invention to provide a number portability processing method wherein an NP database lookup returns a routing number (RN) for a tandem gateway or to a signaling end point.

It is yet another object of the invention to provide an NP processing method wherein an RN database lookup is performed prior to performing an NP database lookup to determine whether an RN in a received call setup message corresponds to the home network of the node performing the lookup or belongs to another network.

Some of the objects of the invention having been stated hereinabove, other objects will become evident as the description proceeds, when taken in connection with the accompanying drawings as best described hereinbelow.

BRIEF DESCRIPTION OF THE DRAWINGS

FIG. 5 illustrates sample routing number (RN) and number portability (NP) database structures and data used in a preferred embodiment of a triggerless number portability routing node of the present invention.

FIGS. 8 and 9 are tables illustrating partial contents of signaling messages received and processed by a triggerless number portability routing node of the present invention.

FIG. 10 illustrates sample routing number (RN) and number portability (NP) database structures and data used in a preferred embodiment of a triggerless number portability routing node of the present invention.

DETAILED DESCRIPTION OF THE INVENTION

According to one embodiment of the present invention, a triggerless number portability (TNP) routing node is provided. The TNP routing node is described and illustrated herein as a collection of processes and subsystems that execute on cards to perform triggerless number portability related routing address translation processing. It is understood that these cards each may include one or more general purpose microprocessors and memory devices. Accordingly, the processes, databases, applications, and subsystems described herein may be implemented by computer-executable instructions embodied in a computer-readable medium. Alternatively, the applications, processes, and subsystems described herein may be implemented in hardware as application-specific integrated circuits (ASICs). Any combination of hardware, software, or hardware and software for performing triggerless number portability processing as described herein is intended to be within the scope of the invention.

Figure 2:
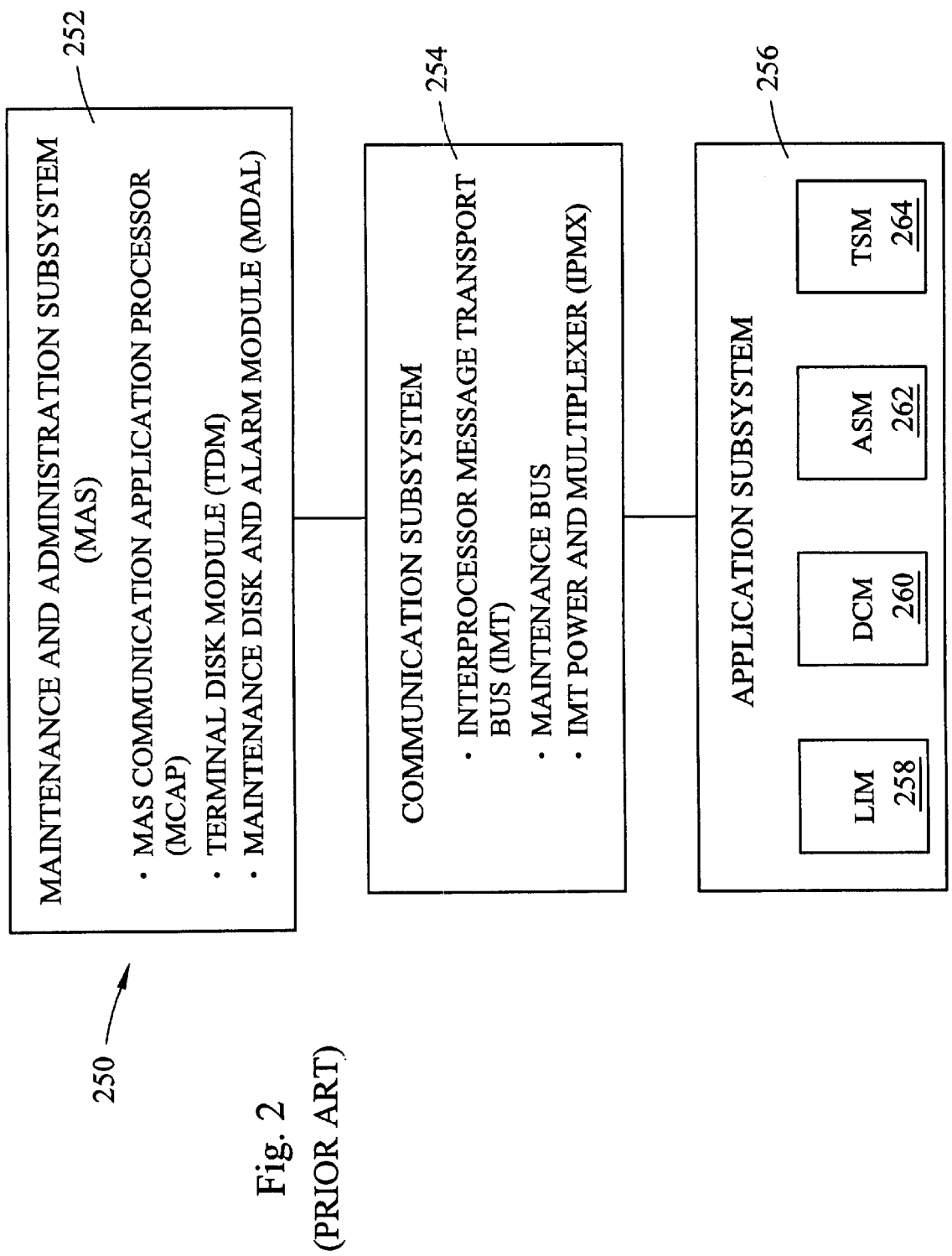
FIG. 2 is a block diagram of a conventional system architecture suitable for use with a triggerless number portability (TNP) routing node of the present invention.

In one embodiment, a triggerless number portability routing node of the present invention employs an internal architecture similar to that of high performance STP and signaling gateway (SG) products marketed by Tekelec of Calabasas, Calif. as the EAGLE® STP and IP$^7$ SECURE GATEWAY™, respectively. A block diagram that generally illustrates the base internal architecture of the IP$^7$ SECURE GATEWAY™ and EAGLE® STP products is shown in FIG. 2. A detailed description of the IP$^7$ SECURE GATEWAY™ may be found in Feature Notice IP$^7$ Secure Gateway™, Release 1.0, PN/909-0767-01, Rev B, Tekelec, August 1999, the disclosure of which is incorporated herein by reference in its entirety. Similarly, a detailed description of the EAGLE® STP may be found in the Eagle® Feature Guide, Rev. B, PN/910-1225-01, Tekelec, January 1998, the disclosure of which is incorporated herein by reference in its entirety.

As described in the above referenced IP$^7$ SECURE GATEWAY™ and EAGLE® STP Feature Guides, an IP$^7$ SECURE GATEWAY™ or EAGLE® STP 250 includes the following subsystems: a maintenance and administration subsystem (MAS) 252, a communication subsystem 254 and an application subsystem 256. MAS 252 provides maintenance communications, initial program load, peripheral services, alarm processing and system disks. Communication subsystem 254 includes an interprocessor message transport (IMT) bus that is the main communication bus among all subsystems in the IP$^7$ SECURE GATEWAY™ or EAGLE® STP 250. This high-speed communications system may include two 125 Mbps counter-rotating serial buses.

Application subsystem 256 includes application cards that are capable of communicating with the other cards through the IMT buses. Numerous types of application cards can be incorporated into Gateway/STP 250, including: a link interface module (LIM) 258 that provides signaling system 7 (SS7) links and X.25 links, a data communication module (DCM) 260 that provides a transmission control protocol/Internet protocol (TCP/IP) based signaling interface, and an application service module (ASM), transaction service module (TSM), and/or database services module (DSM) 262 that provides global title translation, gateway screening and other services, including triggered local number portability service. Once again, a detailed description of the EAGLE® STP is provided in the above-mentioned Eagle® Feature Guide and need not be described in detail herein. With particular regard to the triggered LNP services mentioned above, a detailed description of the Tekelec triggered LNP solution may be found in the Feature Guide LNP LSMS, Revision A, PN/910-1598-01, Tekelec, January 1998, the disclosure of which is incorporated herein by reference in its entirety.

A discussion of one triggerless number portability solution is found in commonly-assigned, copending international patent publication number WO/0060839, the disclosure of which is incorporated herein by reference in its entirety. This solution specifies how call setup messages may be routed without requiring a trigger at the originating end office.

Triggerless Number Portability Routing Node Architecture

Figure 3:
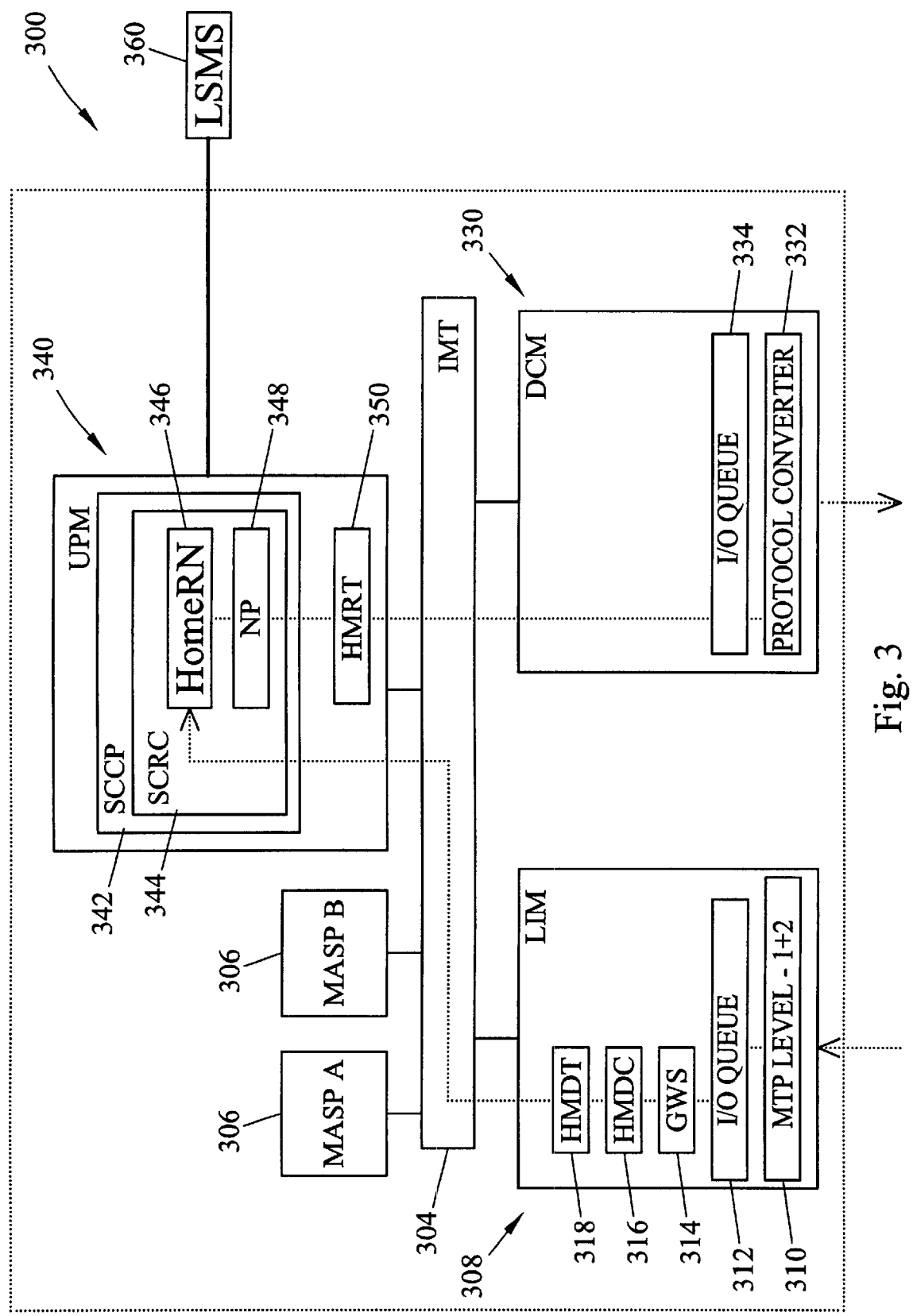
FIG. 3 is a block diagram of an embodiment of a TNP routing node of the present invention, including message flows associated with a number portability database lookup operation.

Presented in FIG. 3 is a preferred embodiment of a triggerless number portability (TNP) routing node of the present invention, which is generally indicated by reference numeral 300. TNP routing node 300 includes a high-speed interprocessor message transport (IMT) communications bus 304. Communicatively coupled to IMT bus 304 are a number of distributed processing modules or cards including: a pair of maintenance and administration subsystem processors (MASPs) 306, an SS7 capable link interface modules (LIM) 308, a TCP/IP capable data communication module (DCM) 330, and a universal portability module (UPM) 340. These modules are physically connected to the MT bus 304 such that signaling and other types of messages may be routed internally between all active cards or modules. For simplicity of illustration, only a single LIM 308, DCM 330, and UPM 340 are included in FIG. 3. However, it should be appreciated that the distributed, multi-processor architecture of the TNP routing node 300 facilitates the deployment of multiple LIM, DGM, UPM, and other cards, all of which could be simultaneously connected to IMT bus 304. In addition, the present invention is not limited to an embodiment in which the functionality of UPM 340 resides internally to routing node 300. In an alternate embodiment of the invention, all or part of the functionality provided by UPM 340 may be located on a platform external to routing node 300. For example, home routing number database 346 and number portability database 348 may be located on an external platform closely coupled to routing node 300, such as the message processing platform (MPP) or ASi 4000 available from Tekelec. The MPP is a Unix-workstation-based platform which is deployed in an EAGLE® frame and can be customized and configured to run any number of varying applications. The ASi 4000 is Tekelec's service control point (SCP), which performs many database applications, such as CNAM, LIDB, etc., and can be customized for other applications, such as the applications described below with regard to preferred embodiments of the present invention. Either of these locations is suitable for housing home RN and/or number portability databases 346 and 348.

MASPs 306 implement the maintenance and administration subsystem functions described above. As MASPs 306 are not particularly relevant to a discussion of the flexible routing attributes of the present invention, a detailed discussion of their function is not provided herein. For a comprehensive discussion of additional MASP operations and functionality, the above-referenced Tekelec publications can be consulted.

Focusing now on LIM card functionality, it will be appreciated that LIM 308 is comprised of a number of sub-component processes including, but not limited to an SS7 MTP level 1 and 2 process 310, an I/O buffer of queue 312, a gateway screening (GWS) process 314, an SS7 MTP level 3 message handling and discrimination (HMDC) process 316, and a message handling and distribution (HMDT) process 318. MTP level 1 and 2 process 310 provide the facilities necessary to send and receive digital data over a particular physical media/physical interface, as well as to provide error detection/correction and sequenced delivery of all SS7 message packets. I/O queue 312 provides for temporary buffering of incoming and outgoing signaling message packets.

GWS process 314 is responsible for examining an incoming signaling message and determining whether TNP service is required. In one embodiment, GWS process 314 examines message transfer part (MTP) origination point code (OPC), destination point code (DPC) and service indicator octet (SIO) parameter values in a received call setup message (e.g., an ISUP IAM message) to determine the need for subsequent TNP type processing.

For example, an operator may decide to have all ISUP IAM messages from a particular set of end offices selected for TNP service. GWS process 314 would be provisioned such that all SIOs indicating ISUP IAMs originating from OPCs belonging to those end offices would be selected for TNP processing. The operator may further fine-tune the selection by entering DPCs of destination end offices for which those IAMs should be selected for TNP service. Thus, only messages containing those specific OPC/DPC/SIO combinations would be selected for TNP processing. Other messages would simply be routed.

Figure 4:
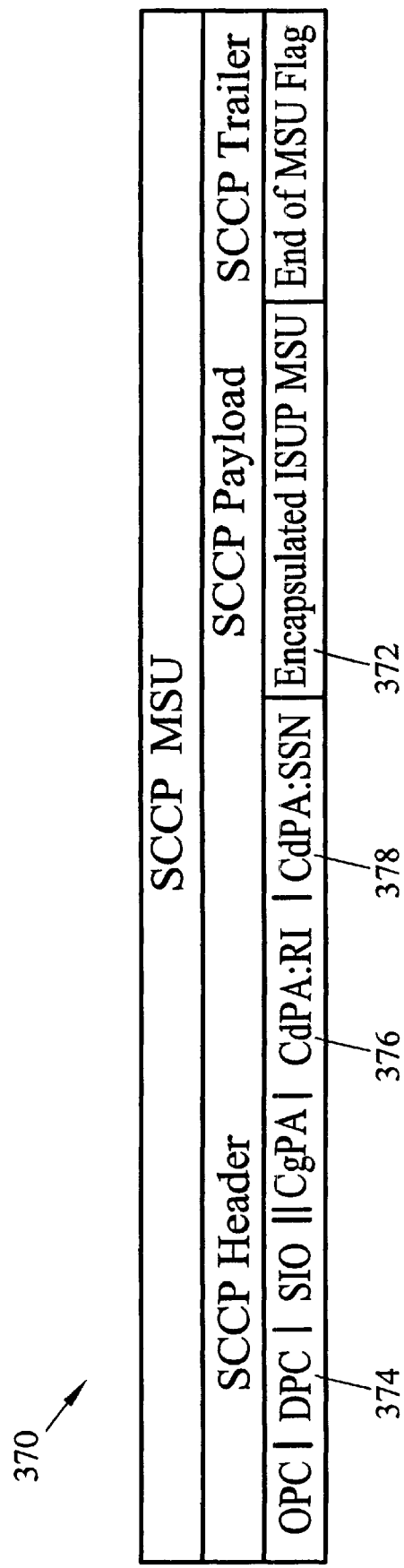
FIG. 4 is a diagram illustrating an SCCP encapsulated ISUP signaling message.

In the event that a signaling message is identified as requiring TNP service, GWS process 314 is further adapted to encapsulate the incoming signaling message packet within an SS7 signaling connection control part (SCCP) formatted packet. Such SCCP encapsulation is effectively achieved by adding essential SCCP message leading and trailing bit sequences to the base bit sequence that comprises an ISUP IAM MSU, as generally illustrated in FIG. 4. Thus, an SCCP type encapsulating MSU 370 is created which envelops or contains an ISUP type MSU 372. Subsequent to this encapsulation, the incoming message no longer appears or is treated as an ISUP IAM message within TNP routing node 300, but is instead processed internally as an SCCP type SS7 message. It should be appreciated that during the encapsulation process, the SCCP MSU destination point code (DPC) field 374 is set to the SS7 point code (PC) of TNP routing node 300, the SCCP MSU called party routing indicator (CdPA RI) field 376 is set to RT-ON-SSN, and the SCCP MSU Called Party Subsystem Number (CdPA SSN) field 378 is set to the NP SSN identifier of TNP routing node 300.

MTP level 3 HMDC process 316 is adapted to receive an SCCP encapsulated signaling message from the lower processing layers and perform a discrimination function, thereby effectively determining whether the message packet is addressed to TNP routing node 300 and requires internal processing or is simply to be through switched. It will be appreciated that in this disclosure, discussions focus on those scenarios where a message received by HMDC process 316 is, in fact, an SCCP encapsulated ISUP IAM message that is addressed to the PC of TNP routing node 300, and consequently are identified as requiring further TNP processing within the node prior to final routing.

HMDT process 318 handles the internal routing of SS7 message packets that require additional processing prior to final routing. Once again, it should be appreciated that a LIM card may contain more functional processes than those described above. The above discussion is limited to LIM functionality associated with the basic processing of in-bound signaling messages.

DCM 330, shown in FIG. 3, includes an Internet protocol (IP) lower level protocol process 332 and an I/O queue 334 that perform functions analogous to their SS7-based LIM counterparts described above. It should be appreciated that outgoing SS7 message packets routed through the DCM 330 will be transmitted out of TNP node 300 and into an Internet protocol (IP) network. As the SS7/message transfer part (MTP) communication protocol and the IP communication protocol are not inherently compatible, SS7 message packets that are to be transmitted via an IP network must first be encapsulated within an IP routing envelope prior to transmission. In one embodiment, IP encapsulation is performed by protocol converter 332. Protocol converter 332 may convert between the SS7 protocol stack and one or more Internet-protocol-based protocol stacks, such as TALI over TCP/IP SUA/M3UA/M2UA over SCTP/IP, H.323 or SIP over TCP/IP, etc. The transport adapter layer interface (TALI) protocol is described in Transport Adapter Layer Interface, IETF Internet Draft, draft-benedyk-sigtran-01.txt, June 2000, the disclosure of which is incorporated herein by reference in its entirety. Furthermore, an implementation of the TALI signaling protocol is described in commonly-assigned, co-pending international patent publication number WO 00/76134, the disclosure of which is incorporated herein by reference in its entirety.

The stream control transmission protocol or SCTP was designed by the IETF as an alternative to TCP or UDP for transmitting SS7 packets over an IP network. The stream control transmission protocol is defined in Stream Control Transmission Protocol, IETF RFC 2960, August 2000, the disclosure of which is incorporated herein by reference in its entirety. The SS7 MTP level 2 user adaptation layer performs the functions of MTP level 2 in an IP network and is defined in SS7 MTP Layer 2 User Adaptation Layer, IETF Internet Draft, draft-ietf-sigtran-m2ua-07.txt, February 2001, the disclosure of which is incorporated herein by reference in its entirety. The MTP level 3 user adaptation layer performs the functions of MTP level 3 in an IP network and is described in SS7 MTP Layer 3 User Adaptation Layer, IETF Internet Draft, draft-ietf-sigtran-m3ua-05.txt, November, 2000, the disclosure of which is incorporated herein by reference in its entirety. The SS7 SCCP user adaptation layer performs the functions of the SS7 SSCP layer and is described in SS7 SCCP User Adaptation Layer, IETF Internet Draft, draft-ietf-sigtran-sua-05.txt, Feb. 1, 2001, the disclosure of which is incorporated herein by reference in its entirety.

The session initiation protocol and associated session description protocol are application level protocols used to establish multimedia sessions between end user devices over an IP network. These protocols are described in Session Initiation Protocol, RFC 2543, March 1999, and Session Description Protocol, RFC 2328, April 1998, respectively, the disclosures of each of which are incorporated by reference in their entirety.

Finally, H.323 is a series of telecommunications standards for voice over IP published by the International Telecommunications Union. The portion of H.323 that may be implemented by protocol converter 332 in DCM 330 according to the present embodiment include ITU Recommendation H.225 and ITU Recommendation H.245, which respectively relate to call signaling and call control signaling. The disclosures of ITU Recommendations H.225 and H.245 are incorporated herein by reference in their entirety.

Although some of the examples described herein relate to the TALI over TCP/IP protocol stack, it will be appreciated that the concepts described in this disclosure are not dependent on the TALI signaling protocol. Any of the above describer protocols for sending call signaling traffic are intended to be within the scope of the invention. It should be noted that both the LIM 308 and DCM 330 may be used for both incoming and outgoing traffic, and node 300 may contain any combination of DCMs and LIMs.

Once again, the description of LIM and DCM subcomponents provided herein is limited to those subcomponents that are relevant to the sample implementation scenarios illustrated throughout this disclosure. For a comprehensive discussion of LIM and DCM operations and functionality, the above-referenced Tekelec publications can be consulted.

In general, a UPM card provides the control and database processes necessary to perform the required network address translations to achieve the triggerless number portability routing functionality implemented by embodiments of the present invention. The UPM 340 shown in FIG. 3 is comprised, in part, of a signaling connection control part (SCCP) process 342, which is adapted to receive an SCCP-encapsulated message packet from IMT bus 304 and subsequently de-capsulate and extract the original SS7 MSU prior to TNP processing. SCCP process 342 further includes a triggerless number portability (TNP) subsystem controller known as a signaling connection routing controller (SCRC) process 344. Responsibilities of SCRC process 344 include, but are not limited to, the directing of an incoming SS7 message packet to either a home routing number (HRN) database 346 and/or a number portability (NP) database 348 and the modification of the message packet to include routing information returned by HRN and NP database 346 and 348, respectively. The access sequence of these two databases is a particularly novel and significant aspect of the present invention. More particularly, in certain signaling message processing scenarios, access to NP database 348 is controlled by information contained within HRN database 346. The novel database access sequence according to embodiments of the present invention will be described in more detail below.

SCRC process 344 is further adapted to examine various parameters in a received call setup signaling message to determine whether the called party number specified in the message has been ported to another service provider and whether a number portability lookup has been previously performed. These parameters include, but are not limited to, a number portability forward information (NPFI) parameter and a nature of address (NOA) parameter. Number portability indicators, such as the NPFI and the NOA, are not universally used to provide number portability status information. Because the number portability routing node of the present invention examines incoming call signaling messages for these and other parameters that indicate number portability status information, the number portability routing node of the present invention can be used in national networks that use different number portability status indicators without modification to the base hardware and software for performing number portability. The processing of these parameters to determine whether to perform a number portability or a routing number lookup will be discussed in more detail below.

SCRC process is further adapted to examine various parameters in a received call setup signaling message to determine whether the called party number specified in the message has been ported to another service provider and whether a number portability lookup has been previously performed. These parameters include but are not limited to a number portability forward information (NPFI) parameter and a nature of address (NOA) parameter. Number portability indicators, such as the NPFI and the NOA are not universally used to provide number portability status information. Because the number portability routing node of the present invention examines incoming call signaling messages for these and other parameters that indicate number portability status information, the number portability routing node of the present invention can be used in national networks that use different number portability status indicators without modification to the base hardware and software for performing number portability. The processing of these parameters to determine whether to perform a number portability or a routing number lookup will be discussed in more detail below.

In any event, SS7 message packets leaving SCRC process 344 are received and further processed by an HMRT process 350. HMRT process 350 is responsible for the internal routing of SS7 message packets that do not require additional processing by TNP node 300. That is, HMRT process 350 determines to which LIM or DCM card an SS7 message packet should be routed for subsequent outbound transmission. It will also be appreciated from FIG. 3 that in one embodiment UPM 340 may be coupled to and serviced by an external provisioning and processing platform, such as local service management system (LSMS) 360, via an external Ethernet connection. LSMS subsystem 360 is responsible for administration and maintenance of HRN and NP databases 346 and 348, respectively. In European telecommunications networks, LSMS 360 may be replaced by the EAGLE® provisioning application processor/multipurpose server (EPAP/MPS) external provisioning platform available from Tekelec. Any external provisioning and processing platform is intended to be within the scope of the invention.

In the diagram shown in FIG. 3, the HRN and NP databases 346 and 348, respectively, are co-resident on UPM card 340. More particularly, in this embodiment of the present invention, these databases are stored in one or more blocks of high-speed random access memory (RAM) that is located on the UPM card. However, the present invention is not limited to internal HRN and NP databases. In an alternative embodiment, HRN and NP databases 346 and 348 may be located on an external processing platform coupled to TNP routing node 300 via a local area network, such as an Ethernet.

Referring to FIG. 5, HRN database 346 is comprised of a single routing number (RN) index or key field 380 and a single Home indicator field 382. As such, HRN database 346 is adapted to store information that allows a routing number to be identified as being associated with an end office or tandem office of in the same commonly-owned network as TNP node 300 (i.e., the RN is a "home routing number"). It will be appreciated that the sample HRN database 346 shown in FIG. 5 employs a table structure that is merely illustrative of the basic function provided by an HRN database of the present invention. In practice, other more efficient data structures, such as tree structures, may be used to decrease the routing number lookup time.

Also shown in FIG. 5, NP database 348 is comprised of a number of entries or records, with each record containing: a dialed number (DN) field 384 that is associated with the called party, a routing number (RN) field 386, a nature of address (NOA) field 388, and a number portability forward information (NPFI) field 390. Once again, it will be appreciated from the discussion above that an RN identifies the signaling point (e.g., tandem, end office, etc.) of the service provider currently serving the called party.

From an operational standpoint, it will be appreciated that if a routing number (RN) contained in an incoming call setup message is identified in the HRN database as corresponding to a node in the same network as the TNP node 300 (i.e., the RN is a home RN), then an NP database lookup may be performed. If the HRN database lookup indicates that the routing number corresponds to a node in another network, then the message may be routed to the other network without performing an NP database lookup. (This would indicate that the node is in a transit network.) As used herein, a routing number is associated with a home network if the TNP routing node performing the lookup and the end office or tandem office identified the routing number are part of the same network. Generally, messages routed from one network and destined for another will be routed through a gateway node as an entry point into the destination network. It is intended that the TNP routing node will be this gateway node. Thus, if the routing number intercepted by the TNP node belongs to a node (tandem or end office) that is part of the same network as the TNP node itself, the RN is considered a "home RN" and the tandem/end office node is considered to be in the "home network" of the TNP node. This implies that the message is intended for this network and the gateway node should allow the message to be passed into its network.

A routing number is associated with a transit network if the TNP routing node performing the lookup and the end office or tandem office identified by the routing number are not in the same network. In this case, the routing number intercepted by the TNP node does not belong to a node (tandem or end office) that is part of the same network as the TNP node. Therefore, the RN is not considered a "home RN" and the tandem/end office node is not considered to be in the "home network" of the TNP node. In this instance, the TNP node is referred to as a "transit node" because it will simply pass the message along to the next gateway node rather than allowing it to enter its network.

By only performing the number portability lookup if the routing number in a call signaling message is associated with a home network, number portability database maintenance is divided among home network service providers. In addition, number portability processing time at triggerless number portability routing nodes in transit networks is reduced. Also, operators are only required to announce a single tandem routing number for other network operators to use, rather than having to divulge routing numbers for all of their end offices.

It will be appreciated from FIG. 3 that UPM 340 may be in communication with and serviced by a local service management system (LSMS) 360. In general, an LSMS system is also in communication with a Number Portability Administration Center (NPAC). As such, an LSMS acts as the interface between carrier networks and the NPAC. In a typical implementation, an LSMS receives and stores ported subscriber information from the NPAC and then, in turn, is responsible for downloading this ported subscriber information to all the LNP databases which it services. As the interaction between an NPAC and an LSMS is not particularly relevant to the present invention, a detailed discussion of such NPAC-LSMS system functionality will not be presented herein. It should suffice to state that LSMS 360 maintains NP database 348 with the most current ported subscriber information available at any given time. As indicated previously, LSMS 360 may be further adapted to administer and maintain HRN database data in a manner similar to that described above for NP database 348.

Triggerless Number Portability Processing

Continuing with FIG. 3, the path of a typical SS7 ISUP IAM signaling message requiring TNP translation service is traced from reception at the TNP routing node 300 by the inbound LIM 308, through the translation process, and on to the outbound DCM 330. A detailed flow chart of TNP related processing steps is presented in FIGS. 6(a)–6(d), and may be used in conjunction with the schematic diagram shown in FIG. 3 to better understand the TNP processing methodology.

Figure 6A:
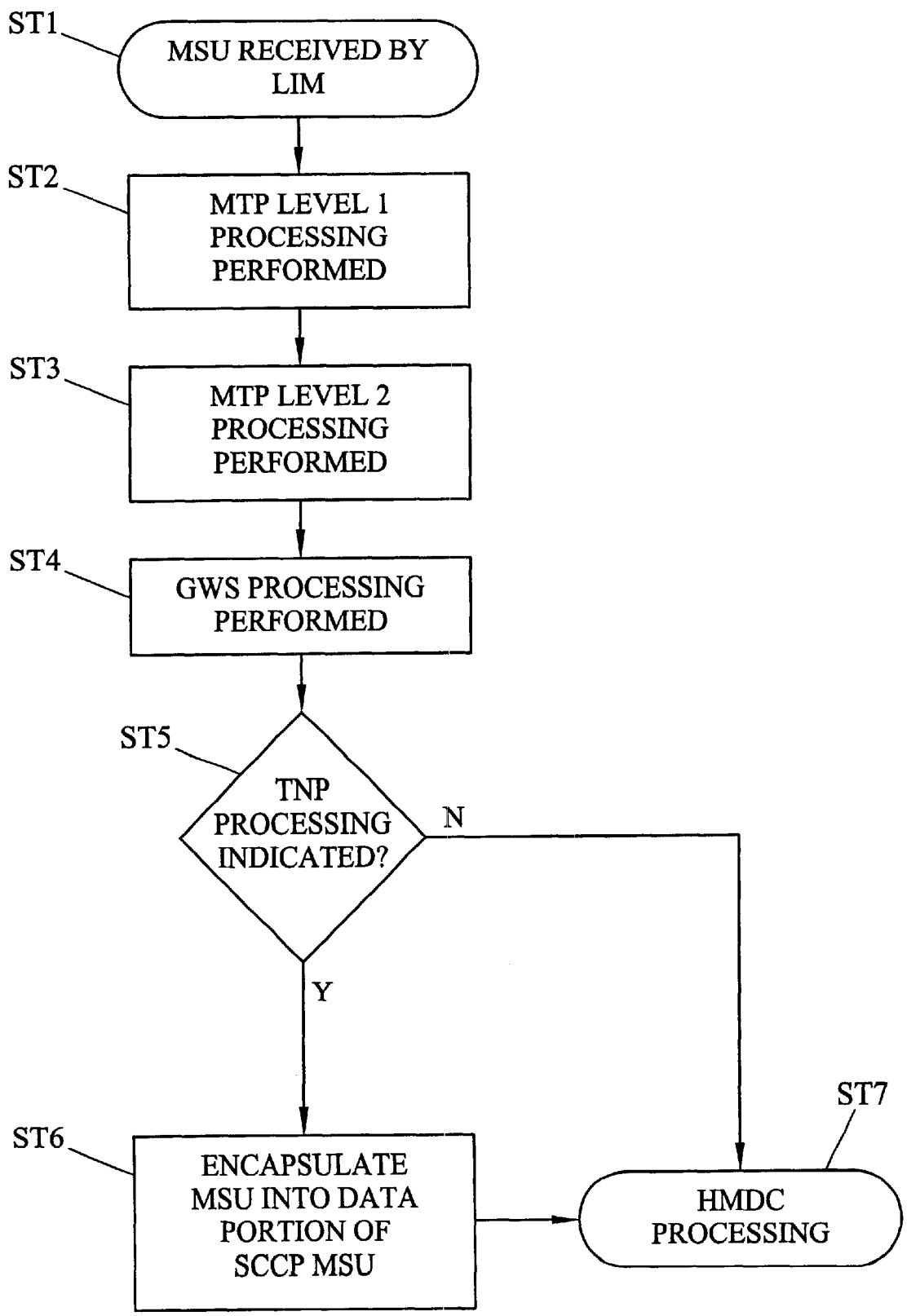
FIGS. 6A–6E are flow charts illustrating number portability translation related processing of a signaling message according to a preferred embodiment of a triggerless number portability routing node of the present invention.

Beginning with step ST1 in FIG. 6A, an incoming ISUP IAM message is received at the inbound LIM module 308. In steps ST2 and ST3, the incoming ISUP IAM message is received and processed by the MTP Level 1 and 2 process 310. As stated above, MTP level 1 and 2 processing includes error detection, error correction, sequencing, and flow control. With MTP Level 1 and 2 processing complete, the signaling message packet is temporarily buffered in the I/O queue 312 before being passed up the stack to the MTP Level 3 gateway screening (GWS) process 314. As indicated in step ST4, GWS process 314 examines the incoming ISUP IAM message and determines not only whether the message is to be allowed into the switch for further processing, but also whether further TNP processing of the incoming message is required. In this example, GWS process 314 examines the incoming ISUP IAM message and determines that the message is permitted to enter the switch. Upon examination of an originating point code (OPC), destination point code (DPC) and service indicator octet (SIO) fields contained in the MTP routing layer, it is determined that the message requires additional TNP processing (ST5). The message is subsequently encapsulated within an SCCP formatted MSU, as indicated in step ST6. Such SCCP encapsulation is effectively achieved by adding essential SCCP message leading and trailing bit sequences to the base bit sequence that comprises the ISUP IAM MSU, as generally illustrated in FIG. 4. Thus, an SCCP type encapsulating MSU is created which envelops or contains an ISUP type MSU. Subsequent to this encapsulation, the incoming message no longer appears or is treated as an ISUP IAM message within the TNP routing node 300, but is instead processed internally as an SCCP type SS7 message. As mentioned previously, during the encapsulation process, the SCCP MSU destination point code (DPC) field 374 is set to the point code (PC) of the TNP routing node 300, the SCCP MSU called party routing indicator (CdPA RI) field 376 is set to route-on-subsystem number (SSN), and the SCCP MSU called party subsystem number (CdPA SSN) field is set to the TNP SSN identifier used within the TNP routing node. It should also be appreciated that failure of the incoming ISUP MSU to meet the criteria specified in step ST4 causes the original, non-encapsulated MSU to be routed directly to HMDC process 316 where message discrimination is performed based on the point code in the original ISUP message.

However, in the case where an incoming ISUP MSU satisfies the ST4 criteria, SCCP encapsulation of the ISUP MSU occurs and the resulting encapsulated MSU 370 is directed to HMDC process 316, where message discrimination is performed based on the destination point code of the SCCP message (ST7). In the example shown in FIG. 3, HMDC process 316 examines the message packet and determines that the DPC of the packet is the PC of TNP routing node 300. Consequently, further processing of the SCCP MSU within the TNP routing node is assumed to be necessary, and the packet is passed to HMDT process 318. HMDT process 318 examines the service indicator (SI) field of MSU 370, which indicates that encapsulating packet 370 is of an SCCP type. As such, HMDT process 318 places the encapsulating SCCP MSU 370 on high speed MT bus 304 for transport to UPM 340 and subsequent TNP processing.

Figure 6B:
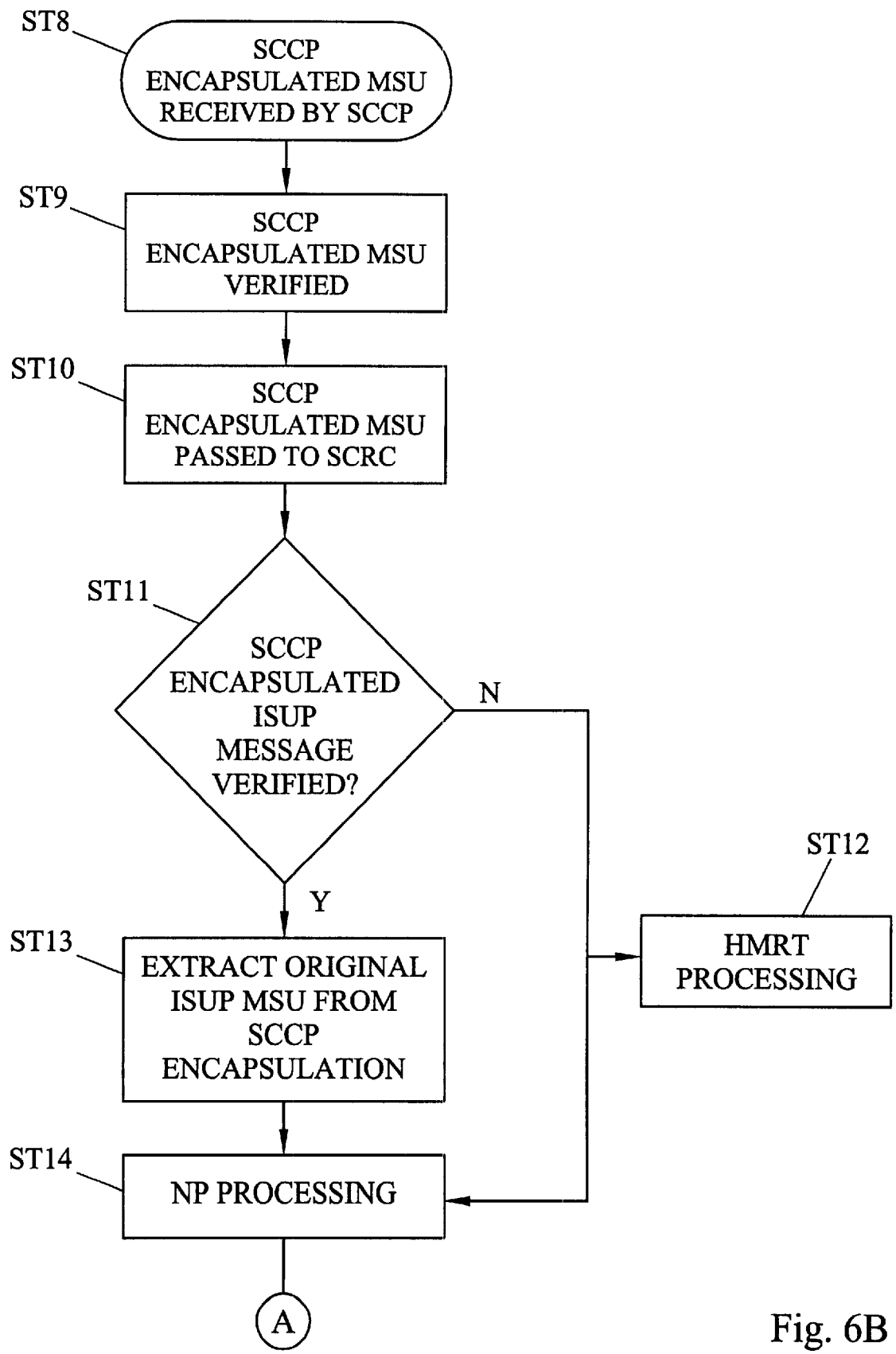

Referring now to FIG. 6B, in step ST8, the encapsulating SCCP MSU 370 is received and verified (ST9) by SCCP process 342 that is resident on UPM 340. In steps ST10 and ST11, SCCP encapsulating message 370 is passed to SCRC process 344, where it is verified that the SCCP MSU contains an encapsulated ISUP MSU. Such verification processing may include the verification of the pointers and field lengths associated with the ISUP message. In the event that the contents of the encapsulating packet are determined to be something other than an ISUP IAM signaling message, the packet is passed to HMRT process 350 for outbound routing or possibly further processing at another card on the MT bus 304 (ST12). With a positive verification at step ST11, the original ISUP MSU is extracted by removing and discarding the SCCP wrapper (ST13). In one embodiment, SCRC process 344 next performs a number of operations intended to validate one or more of the Called Party (CdPA) parameters contained in the original ISUP MSU. Such validation operations may include, but are not limited to: verification that the Called Party Number exists and verification that the Called Party Number is of the correct format. Should verification of one or more of these parameters fail, the message may be forwarded to HMRT process 350 for outbound processing, in a manner similar to that described for step ST11.

In the event that the appropriate parameters are successfully verified, the de-capsulated, original ISUP IAM MSU, or at least a portion of the information contained in that original MSU, is subjected to TNP processing as indicated in step ST14.

Figure 6C:
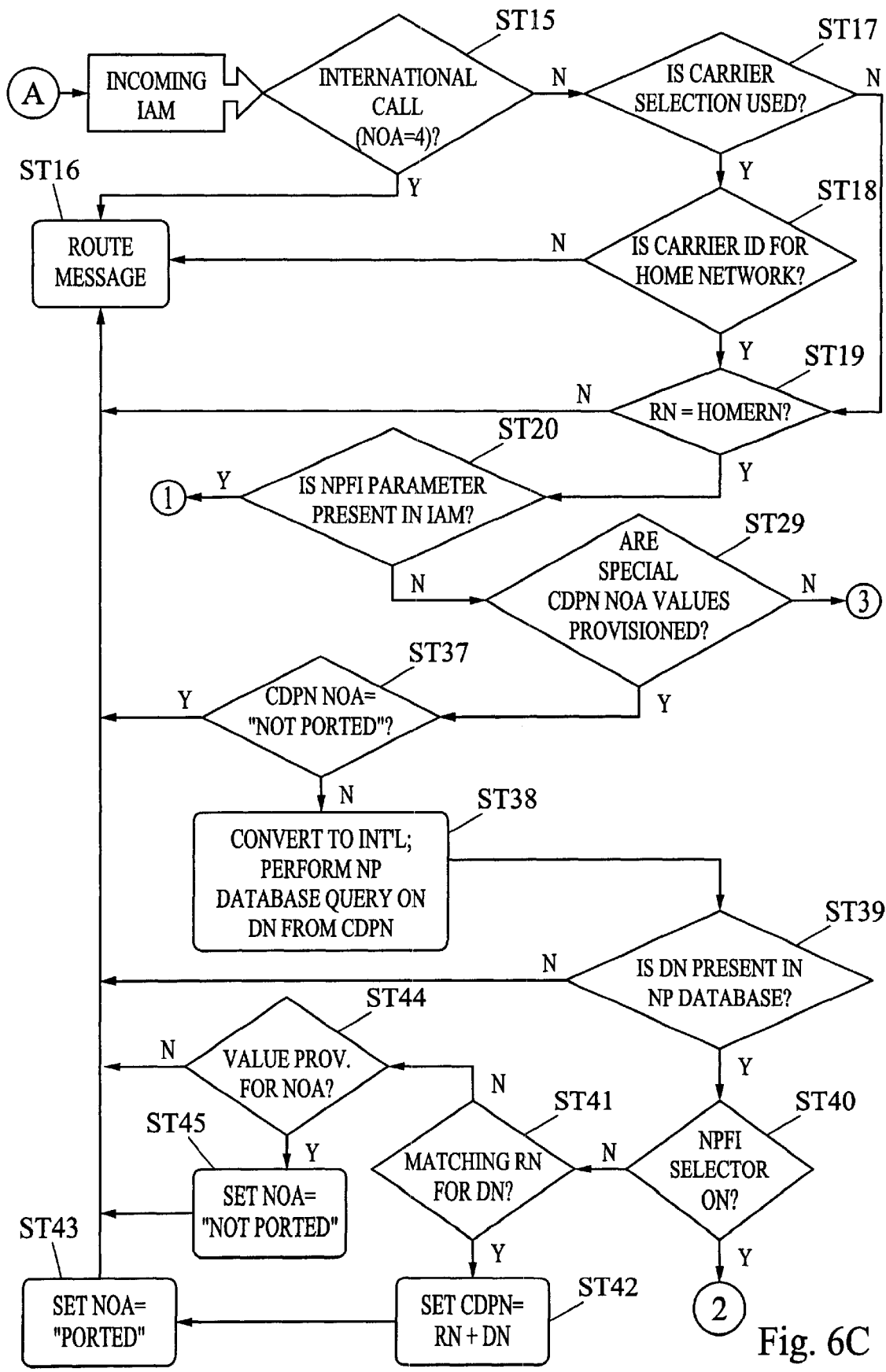

Referring to FIG. 6C, TNP processing begins with a check of a nature of address (NOA) parameter contained within the ISUP IAM message to determine whether the intended call is of a domestic or an international nature (ST15). In the event that a call is identified via a predetermined NOA value (e.g., NOA=4) as being an international call, TNP processing is halted and the ISUP IAM message is simply routed from the TNP node 300 without modification (ST16). If the NOA parameter value indicates that the ISUP IAM message is associated with a national call, an additional check for the presence or use of carrier selection information is performed (ST17) via carrier selection code (CSC) and carrier identification (CID) parameters contained within the ISUP IAM message. More particularly, the called party or dialed number in the ISUP message is examined for the presence of a CSC in the E.164 dialed number. If a CSC is present, in step ST18, the corresponding CID is examined to determine whether the CID indicates that the message is associated with the home network. If the carrier ID is not associated with the home network, the message is forwarded to HMRT process 350 for routing to the appropriate network (ST16).

However, if the carrier ID is found to be associated with the home network, a routing number (RN) is extracted from the message and subsequently employed to perform a lookup in HRN database 346 (ST19). Such an HRN database lookup is used to determine whether the RN contained in the ISUP IAM message is associated with a "home" signaling point (e.g., tandem, end office, etc.). If the HRN database 346 indicates that the RN is not a "home" RN, then the ISUP IAM message is forwarded to HMRT process 350 for routing to the appropriate network (ST19). In the event that the HRN database lookup operation indicates that the RN is a "home" RN, then a check is performed to determine whether an optional number portability forward information (NPFI) parameter is present in the ISUP IAM message (ST20).

Figure 6D:
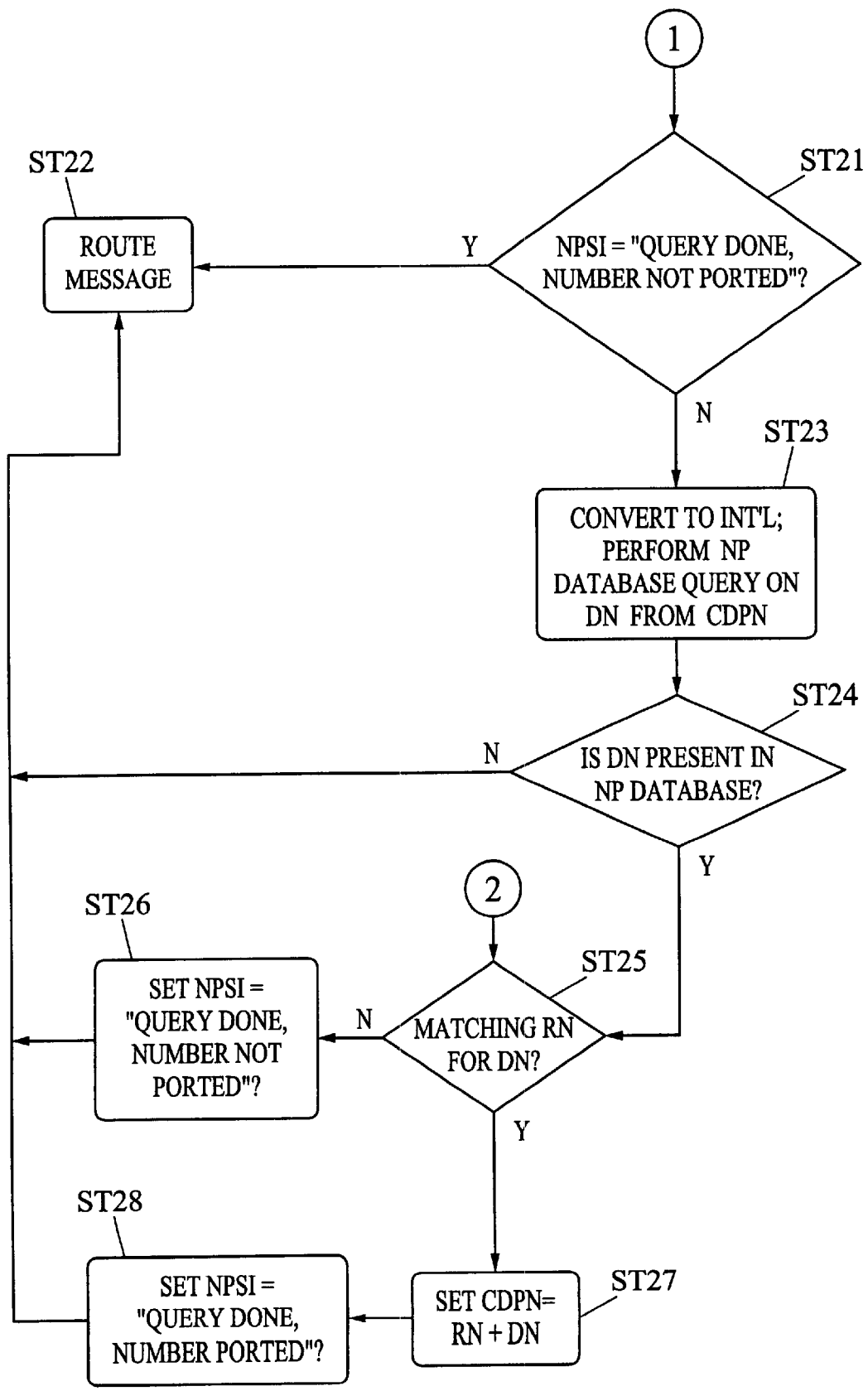

Referring to FIG. 6D, in step ST21, if an NPFI is found to be present in the ASUP IAM message, then a check of a number portability status indicator (NPSI) bit in the NPFI parameter is performed. If the NPSI parameter value indicates that a number portability query or translation has already been performed and that the number is not ported, then the ISUP IAM message is forwarded to HMRT process 350 for routing to the appropriate network (ST22). However, if the NPSI parameter value indicates that a number portability translation has already been performed and that the number is ported or gives no indication of ported status, then the called party or dialed number (DN) is extracted from the ISUP IAM message, properly conditioned or formatted, and subsequently used to perform a lookup in the NP database 348 (ST23 and ST24). If the DN value is not located in NP database (i.e. no indication is given of ported status), then the ISUP IAM message is forwarded to HMRT process 350 for routing to the appropriate network (ST22). However, if the DN value is located in NP database, then a check is made to determine whether a routing number is associated with the matching DN entry in the NP database (ST25). In the event that there is no RN value in the NP database corresponding to the matching DN, then the NPSI parameter of the ISUP IAM message is set to a value which indicates "Query Done, Number Not Ported" (ST26), and the message is subsequently forwarded to HMRT process 350 for routing to the appropriate network (ST22). If there is an RN value in the NP database Corresponding to the matching DN, then the called party dialed number parameter of the ISUP IAM message is set to a value that corresponds to the original DN with the returned RN pre-pended (i.e., RN+DN), as indicated in step ST27. The NPSI parameter of the ISUP IAM message is then set to a value which indicates "Query Done, Number Ported" (ST28), and the message is subsequently forwarded to HMRT process 350 for routing to the appropriate network (ST25).

Returning to step ST20 in FIG. 6C, if an NPFI parameter is not present in the ISUP IAM message, a check is made to determine the value of a nature of address (NOA) indicator that is contained within the called party number field of the ISUP IAM message (ST29). The NOA parameter may contain one of a number of specially provisioned values that are used to identify portability status. In the event that specially provisioned NOA values are not employed in the network, referring to FIG. 6E, a check is performed to determine if a routing number contained within the ISUP IAM message is indicative of the Portability status of the DN associated with the message (ST3O). If the RN indicates that the DN is not ported then the message is subsequently forwarded to HMRT process 350 for routing to the appropriate network (ST31). However, if the RN indicates that the DN is ported then the called party or dialed number (DN) is extracted from the ISUP IAM message, properly conditioned or formatted, and subsequently used to perform a lookup in the NP database 348 (ST32 and ST33). If the DN value is not located in NP database, then the ISUP IAM message is forwarded to HMRT process 350 for routing to the appropriate network (ST31). However, if the DN value is located in NP database, then a check is made to determine whether an associated NPFI Selector value in the NP database is set or "On" (ST34). If the NPFI Selector value associated with the matching DN entry is not set or is "Off", a check is made to determine whether a routing number is associated with the matching DN entry in the NP database (ST35). In the event, that there is no RN provisioned for the matching DN entry, the ISUP IAM message is forwarded to HMRT process 350 for routing to the appropriate network (ST31). If an RN is provisioned for the matching DN entry in NP database 348, then the called party dialed number parameter of the ISUP IAM message is set to a value that corresponds to the original DN with the returned RN pre-pended (i.e., RN+DN), as indicated in step ST36, and the message is forwarded to HMRT process 350 for routing to the appropriate network (ST31).

Returning to step ST34, if the NPFI Selector value associated with the matching DN entry is set or is "On" then control proceeds to step ST25 in FIG. 6D where a check is made to determine whether a routing number is associated with the matching DN entry in the NP database. In the event that there is no RN value in the NP database corresponding to the matching DN, then the NPSI parameter of the ISUP IAM message is set to a value which indicates "Query Done, Number Not Ported" (ST26), and the message is subsequently forwarded to HMRT process 350 for routing to the appropriate network (ST22). If there is an RN value in the NP database corresponding to the matching DN, then the called party dialed number parameter of the ISUP IAM message is set to a value that corresponds to the original DN with the returned RN pre-pended (i.e., RN+DN), as indicated in step ST27. The NPSI parameter of the ISUP IAM message is then set to a value which indicates "Query Done, Number Ported" (ST28), and the message is subsequently forwarded to HMRT process 350 for routing to the appropriate network (ST22).

Returning to step ST29 in FIG. 6C, in the case that specially provisioned NoA values are used within the network to indicate portability status, a check is made of the NoA value in the received message (ST37). If the value indicates that a portability check has been done on the CdPN:DN and the number has not been ported, the message will be routed with no further processing or modifications (ST16). If the NoA value indicates that the number has been ported, or gives no indication of portability status, an NP database lookup will be performed on the number as previously described in this document. More particularly, in step ST38, the dialed number is converted to international format and used to perform a lookup in number portability database 348. In step ST39, it is determined whether the dialed number is present in NP database 348. If the dialed number is not present, the message is routed to its destination node (ST16). If the dialed number is present in the NP database, in step ST4O, it is determined whether the number portability forwarding indicator selector is "On." If the NPFI in the database entry for the dialed number is "On", control proceeds to FIG. 6(d), as previously described. If the NPFI selector is "Off", then the entry is examined to determine whether a routing number is present for the dialed number (ST1). If a routing number is present for the dialed number, in step ST42, a new CdPN=RN+DN will be placed in the message. In step ST43, the NoA is changed to indicate the number is ported, and the message is routed. In step ST41, if a matching RN is not found, implying the number is not ported, the message will be routed without modification except the NoA value may be changed in steps ST44 and ST45 to indicate the number is not ported, if a special value has been provisioned.

Figure 6E:
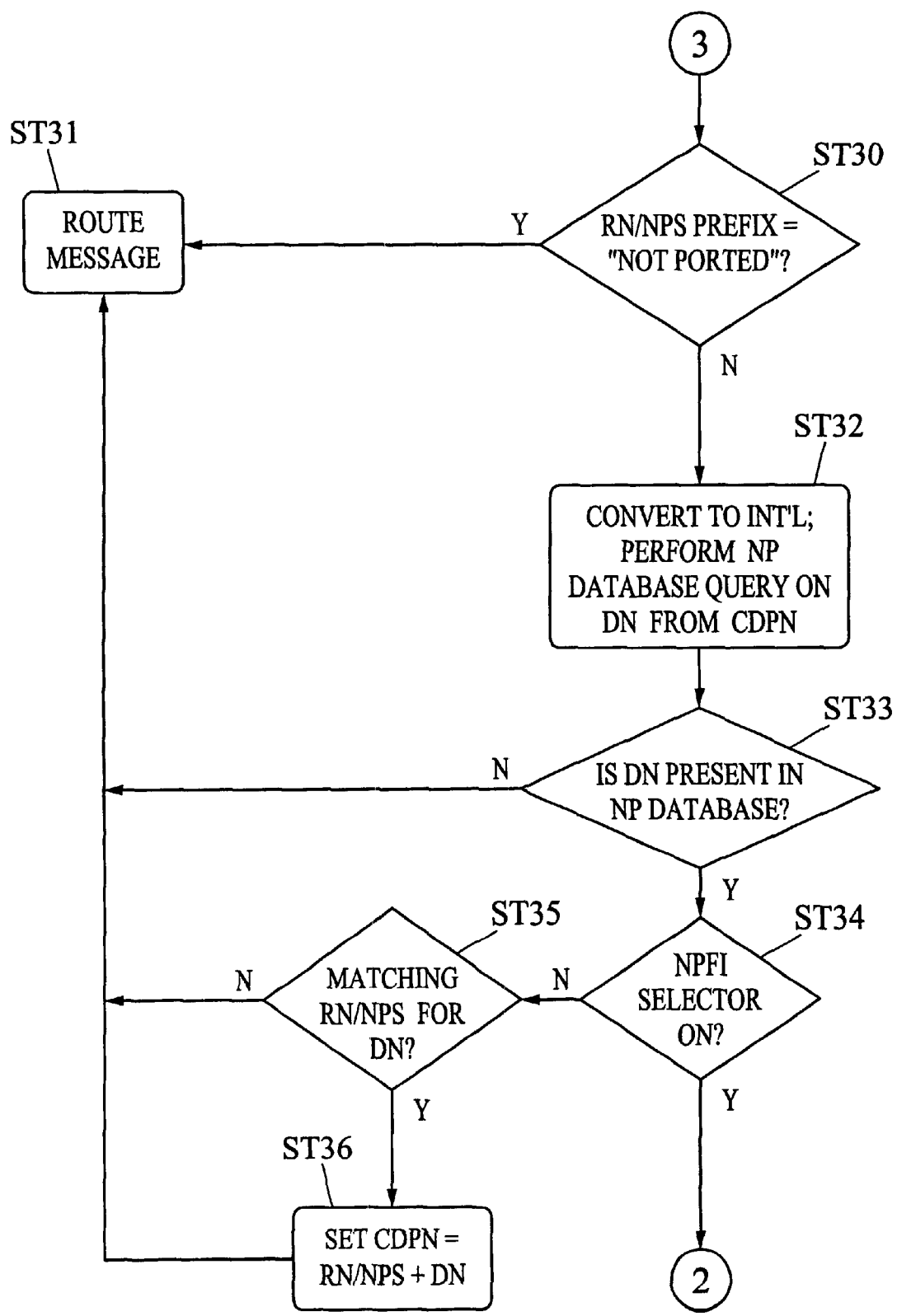

Thus, as is apparent from FIGS. 6A–6E, the triggerless number portability routing node examines a variety of parameters in incoming call signaling messages as conditions to performing a number portability lookup. For example, as stated above, the routing number in the call signaling message is examined to determine whether the routing number is associated with a home network. In addition, FIG. 6D illustrates the steps by which the NPFI parameters are used to determine whether a number has been ported and whether a query has been previously performed for a call signaling message as a condition to accessing the number portability database. FIG. 6E illustrates steps by which parameters in the routing number itself are used to determine whether a number has been ported. Finally, step ST37 in FIG. 6C indicates steps by which specially provisioned NOA parameters in a message are used to determine whether a number has been ported. By provisioning the routing node with multiple SCCP parameters on which access to the number portability database, the number portability routing node according to embodiments of the can be used in different national networks without modification to the base software.

Sample TNP Call Setup Message Flow

Figure 7:
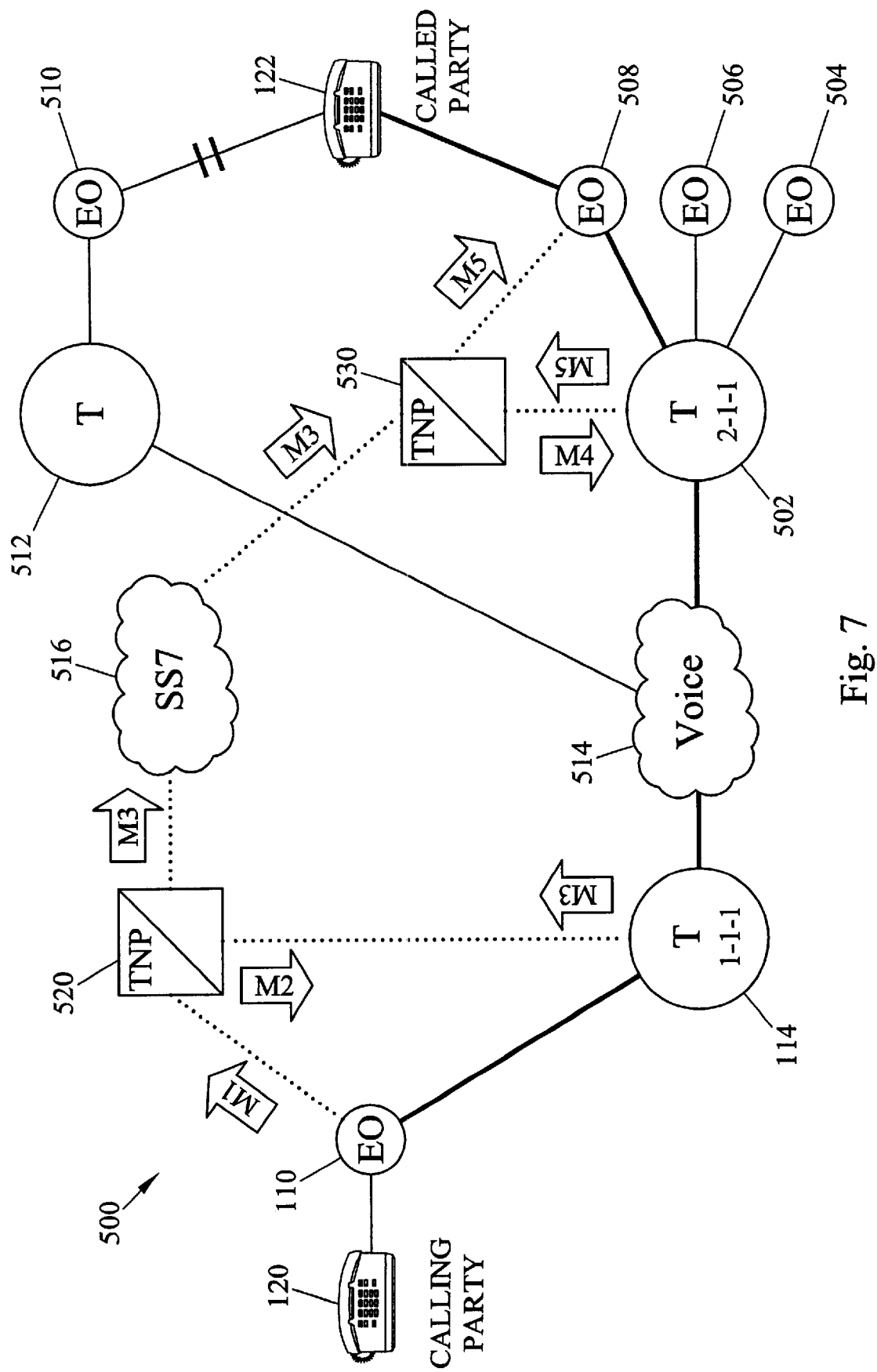
FIG. 7 is a diagram illustrating a network implementation of a triggerless number portability routing node of the present invention and signaling message flows associated therewith.

Shown in FIG. 7 is a simplified network diagram that illustrates a sample call flow associated with a triggerless ported number call setup scenario. It will be appreciated that FIG. 7 includes a telecommunications network, generally indicated by the numeral 500. Telecommunications network 500 is further comprised of a number of discrete network elements and communication terminals, several of which were presented in FIG. 1. More particularly, network 500 includes an originating End Office (EO) 110, a recipient terminating EO 508, a donor terminating EO 510, an originating tandem office 114, a recipient tandem office 502, a donor tandem office 512, a first EO 504, a second EO 506, a calling party terminal 120, and a called party terminal 122. Network 500 also includes an originating TNP routing node 520 and a recipient TNP routing node 530. Network 500 further includes an SS7 signaling network 516 which is adapted to communicate signaling messages between various signaling point nodes. Network 500 also includes a voice network 514 that is adapted to communicate voice data between various EO and tandem nodes.

For the purposes of illustration, it is assumed that each EO and tandem facility shown in FIG. 7 is assigned a unique routing number (RN). More particularly, EO 110 is assigned an RN of 9193450001, EO 510 is assigned an RN of 2125550001, EO 508 is assigned an RN of 9194690001, EO 506 is assigned an RN of 9194690002, EO 504 is assigned an RN of 9194690003, tandem 114 is assigned an RN of 9193450000, tandem 512 is assigned an RN of 2125550000, and tandem 502 is assigned an RN of 9194690000. Again, it will be appreciated that a routing number (RN) is a number that uniquely identifies an end office or tandem facility in the public switched telephone network (or mobile switching center in a wireless communication network). Within the context of number portability, an RN identifies the EO or tandem facility that is currently serving the called party.

In this example, it is assumed that the called party 122 has had local phone service ported from a service provider that owns EO 510 to a service provider that owns EO 508. Consequently, it is implied that the service responsibility for called party 122 was transferred from the donor EO 510 to the recipient EO 508 at some point in the past. As such, EO 508 is now assumed to service called party 122. Once again, the diagram shown in FIG. 7 is intended to generally illustrate the flow of SS7 call setup messages in response to the placement of a telephone call from calling party 120 to the ported called party 122. FIGS. 8 and 9 provide sample ISUP IAM message contents before and after TNP processing that is performed by TNP nodes 520 and 530, respectively, in the example scenario presented in FIG. 7. It will be appreciated that the fields shown in FIGS. 8 and 9 are a subset of the fields contained within a typical ISUP IAM message, and consequently FIGS. 8 and 9 are not intended to represent complete ISUP IAM messages. It will also be appreciated that the sample HRN and NP databases 346 and 348, respectively, shown in FIG. 5 are used in the following example as simplified representations of the HRN and NP databases present in TNP routing node 520. In a similar manner, sample HRN and NP databases 700 and 710, respectively, shown in FIG. 10 are used in the following example as simplified representations of the HRN and NP databases present in TNP routing node 530.

With regard to FIGS. 8 and 9, the sample ISUP IAM messages illustrated therein include an originating point code (OPC) parameter 600, a destination point code (DPC) parameter 602, a service indicator octet (SIO) parameter 604, a calling party dialed number (CgPA:DN) parameter 606, a called party dialed number (CdPA:DN) parameter 608, an optional called party number portability forward information (CdPA:NPFI) parameter 610, and a called party nature of address (CdPA:NOA) parameter 612.

Referring back to FIG. 7, in response to call initiating activity performed by calling party 120, the originating EO 110 formulates and launches an ISUP IAM message M1 to the TNP routing node 520. In this example, it is assumed that the EO 110 has been assigned an SS7 network address or point code (PC) of 1-1-0, while TNP routing node 520 has a PC of 3-0-0, tandem office 114 has a PC of 1-1-1, tandem office 502 has a PC of 2-1-1, and end office EO 508 has a PC of 2-1-2. It is further assumed that the calling party 120 has been assigned a phone number of 9194671234 and that called party 122 has a phone number of 9194675500. As such, it will be appreciated from FIG. 7 that ISUP IAM message M1 includes calling and called party information associated with calling party 120 and called party 122, respectively. It will also be appreciated that the OPC of the message M1 is set to 1-1-0, while the DPC is set to 1-1-1. Also, in message M1, the SIO will indicate an ISUP message and the NoA is assumed to indicate a national call.

Returning now to the message flow shown in FIG. 7, ISUP IAM message M1 is received by the TNP routing node 520 and subsequently examined to determine whether TNP processing is required. In this case, TNP translation service is indicated by the OPC/DPC/SIO combination, and TNP processing is performed a TNP routing node 520 by a TNP subsystem similar to UPM 340, as discussed previously and shown in FIG. 3. For the purposes of illustration, it is assumed in this example that the message M1 is processed by a UPM card using the functional entities and general methodology that has been described above in detail. As such, it will be appreciated that TNP processing of message M1 results in an NP database lookup, using the CdPA:DN parameter 608 contained within the message. Once again, in this example, the NP database 348 shown in FIG. 5 is assumed to be associated with the TNP subsystem of TNP routing node 520. Consequently, a lookup in NP database 348 results in a match with the first entry in the database (i.e., DN=9194675500). It will be appreciated that a matching entry in the NP database implies that the CdPA:DN associated with the call is known to be ported. Accordingly, the RN corresponding to the matching DN entry in database 348 is returned and pre-pended to the original CdPA:DN value, so as to yield a new CdPA:DN value of 91946900009194675500. In this example, the pre-pended RN value of 9194690000 corresponds to the RN identifier associated with the recipient tandem office 502. By recipient tandem office, it is meant that tandem office 502 configured within the network 500 so as to provide access to the end office facility that is servicing the ported, called party (i.e., EO 508).

It is significant and should be noted that the RN returned by the TNP lookup at routing node 520 does not represent or indicate the actual EO that is servicing the ported, called party. As such, implementation of a TNP routing node of the present invention in a network, particularly in the case of a "recipient" network, allows the network operator to easily add EO facilities to an existing network infrastructure without requiring that the RN identifiers associated with each newly added EO facility be distributed and implemented by all other network operators. Instead, the network operator employing a TNP routing node of the present invention need only distribute a single RN (i.e., the RN associated with the recipient tandem office) that is effectively representative of a plurality of individual EO facilities. For example, a large network operator with 1000 EO facilities and 10 tandem offices need only distribute the 10 RN values to other network operators instead of 1000. Furthermore, the addition of EO facility 504 or 506 would not require that a new RN be distributed to other operators, as the new EO facility would be effectively "hidden" from the other network operators by it's serving tandem office. It will be appreciated that it is the ability of TNP routing node of the present invention to perform a number portability lookup on an incoming message, even if the message has already had a previous NP translation and is marked accordingly, that permits such efficient network wide NP operation.

In any event, returning to FIG. 8, it will be appreciated that the contents of ISUP IAM message M1 are slightly modified so as to form a new message (M2) which includes the recipient network RN. It should also be noted that the CdPA:NOA parameter 612 is set to indicate that an NP translation has been performed and that the CdPA:DN associated with this message was found to have been ported. For simplicity, the optional NPFI parameter is not used in this example. The message M2 is then routed from TNP node 520 and transmitted to tandem office 114. Tandem 114 receives and processes the message M2, and subsequently generates a new signaling message (M3) that is also associated with setup of the call, based on the RN it received. In this example, message M3 is transmitted back to and routed by TNP node 520. More particularly, message M3 is routed via SS7 network 516 to the "recipient" TNP routing node 530. It will be appreciated from previous discussion that when TNP 520 receives M3, it will not recognize the RN pre-pended to the CdPN:DN as one of its "home" RNs. As a result, it will simply route M3 without further processing.

Upon receipt of message M3, TNP routing node 530 performs TNP processing in a manner similar to that described previously in this disclosure. In this case, a check of the RN contained within the received message (CdPA:DN=(RN+DN)=(91946900009194675500) indicates that the RN is a "home" RN. That is, the RN specified in the message corresponds to a signaling point (i.e., tandem office 502) that is in the home network of TNP routing node 530. Again, sample "recipient" HRN and NP databases, 700 and 710, respectively, contained within the TNP node 530 are shown in FIG. 10. As such, a lookup in NP database 710 is performed on the CdPN:DN, after stripping off the RN, so as to effectively determine which EO facility associated with tandem 502 is currently servicing the called party (i.e., CdPA:DN=9194675500). It will be appreciated from NP database 710 that a lookup using 9194675500 results in a match with the first entry in the database. The matching NP database entry indicates that the RN associated with the EO (i.e., EO 508) currently servicing the called party is 9194690001, and as such the message M3 is modified to include the new RN, thereby forming a new message M4. As indicated in FIG. 9, the CdPA:DN parameter 608 in message M4 is set to a value which reflects the new RN and the original called party DN (i.e., RN+DN). The message M4 is subsequently routed on to tandem 502. Tandem 502 locates the PC for EO 508 based on the RN received in M4 and formulates message M5 and sends it to TNP 530. If tandem 502 includes the RN=9194690001, TNP 530 will recognize it as a "home" RN and will perform another NP lookup on the CdPN:DN that results in the same RN. TNP 530 will then formulate M6 and route it to EO 508. Note that M6 would be identical to M5 in this case, and that this step would be unnecessary if tandem 502 did not include the RN in M5. In the latter case, TNP 530 would attempt an RN lookup on the CdPN:DN and would not recognize it as a "home" RN, in which case it would simply rout M5 on to EO 508 unchanged. Either way, EO 508 receives the message and performs the steps necessary to complete the call setup.

Once again, those skilled in the art of telecommunication network operations will appreciate that additional call setup and teardown messages, not shown in FIG. 7, may be necessary to administer a complete a telephone call between the calling party 120 and the called party 122. The signaling message flow shown in FIG. 7 is intended only to generally illustrate a TNP translation process of the present invention. As these additional signaling messages are not particularly relevant to the design and operation of the present invention, a detailed discussion of call setup and teardown procedures in an SS7 telecommunications network is not provided herein.

Figure 1:
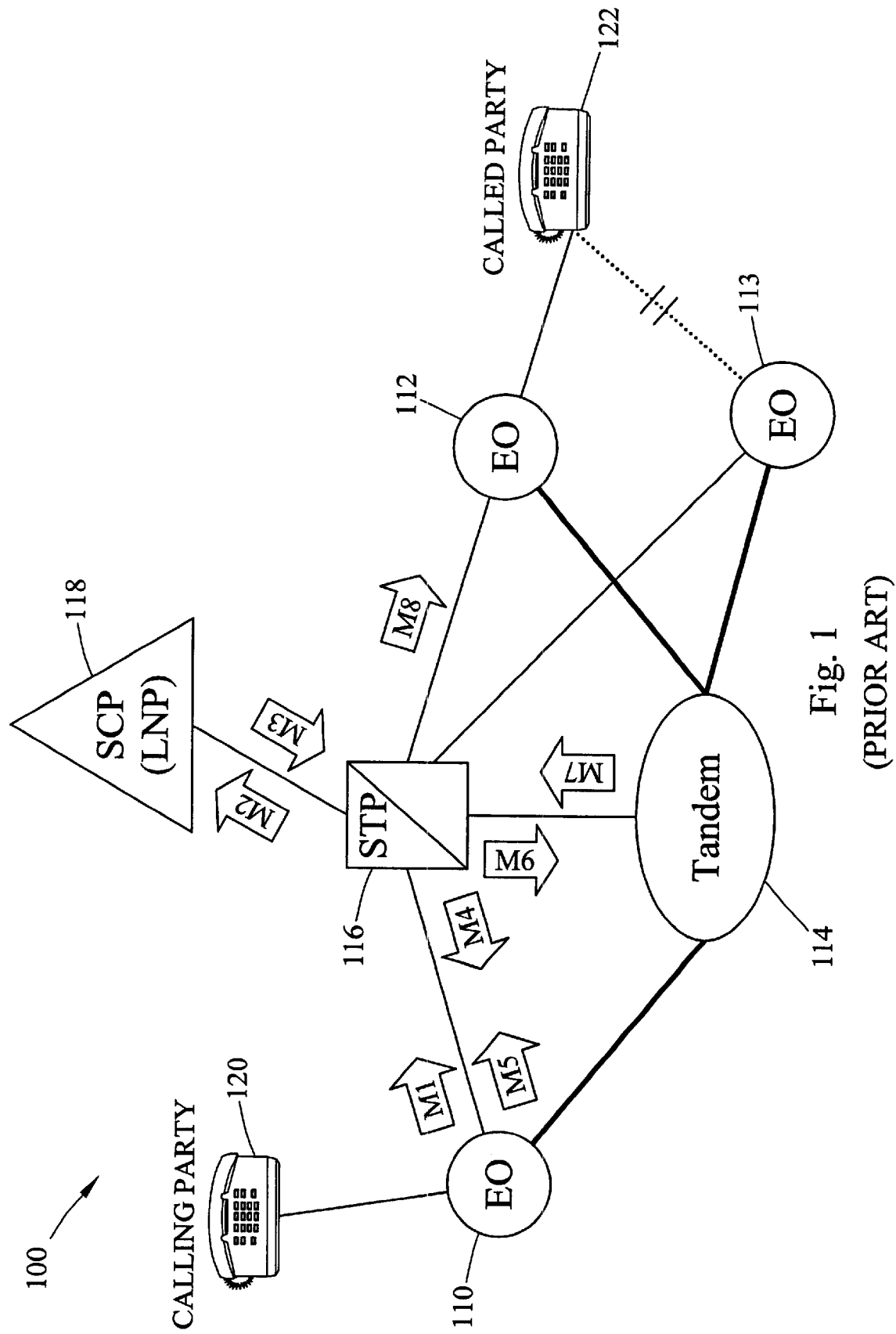
FIG. 1 is a network diagram illustrating a triggered NP solution and associated signaling message flows.

The triggerless number portability processing illustrated in FIG. 7 can be contrasted with conventional triggered number portability processing illustrated in FIG. 1. First, because TNP routing node 520 determines whether number portability processing is required, originating end office 110 need not have a number portability processing trigger as required by the system in FIG. 1. This is a significant advantage, since it is burdensome to program multiple end offices to trigger inquiries for ported numbers.

Another advantage provided by the implementation of universal triggerless number portability according to the present invention is the ability to return the routing number for a tandem gateway, rather than an individual end office and have another TNP node do another lookup to obtain the end office RN. As a result, the addition of end offices to a network does not necessitate reprovisioning of remote number portability databases in other networks, and makes the NP databases in the TNP nodes smaller and more efficient. Routing numbers of local end offices are maintained as private addresses, since only the routing number of the serving tandem gateway is provisioned in databases of other networks.

It will be understood that various details of the invention may be changed without departing from the scope of the invention. Furthermore, the foregoing description is for the purpose of illustration only, and not for the purpose of limitation—the invention being defined by the claims.

What is claimed is:

1. A universal triggerless number portability (TNP) routing node comprising:

(a) a first communication module for receiving a first message from a first end office over a first communications network, the first message including a dialed number;

(b) a number portability (NP) database containing routing numbers (RNs) for signaling points serving ported subscribers;

(c) a home routing number (HRN) process for receiving the first message from the first communication module, determining whether a first routing number (RN) in the first message is associated with a signaling point in a home network, and for forwarding the first message for further number portability processing only if the first RN is associated with a signaling point in the home network; and (d) a triggerless number portability process for receiving the first message from the HRN process, analyzing the first message for the presence of a first parameter for storing number portability status information, wherein, if the first parameter is determined to be present, the triggerless number portability process is adapted to determine whether to perform a lookup in the number portability database based on the first parameter, and wherein, if the first parameter is determined not to be present, the triggerless number portability process is adapted to analyze the first message for the presence of a second parameter for storing number portability status information, the second parameter being different from the first parameter, and, if the second parameter is present, to determine whether to perform the lookup in the number portability database based of the second parameter.

2. A universal triggerless number portability routing (TNP) node comprising:

(a) a first communication module for receiving a first message from a first end office over a first communications network, the first message including a dialed number, wherein the first communication module is a message transfer part (MTP)/signaling system 7 (SS7) capable link interface module (LIM);

(b) a number portability (NP) database containing routing numbers (RNs) for signaling points serving ported subscribers;

(c) a home routing number (HRN) process for receiving the first message from the first communication module, determining whether a first routing number (RN) in the first message is associated with a signaling point in a home network, and for forwarding the first message for further number portability processing only if the first RN is associated with a signaling point in the home network; and (d) a triggerless number portability process for receiving the first message from the HRN process, analyzing the first message for the presence of one or more number portability status indicators, and determining whether to perform a lookup in the number portability database based on any of the number portability status indicators determined to be present in the first message.

3. A universal triggerless number portability (TNP) routing node comprising:
  (a) a first communication module for receiving a first message from a first end office over a first communications network, the first message including a dialed number, wherein the first communication module is an Internet protocol (IP)/transport adapter layer interface (TALI) capable data communication module (DCM);
  (b) a number portability (NP) database containing routing numbers (RNs) for signaling points serving ported subscribers;
  (c) a home routing number (HRN) process for receiving the first message from the first communication module, determining whether a first routing number (RN) in the first message is associated with a signaling point in a home network, and for forwarding the first message for further number portability processing only if the first RN is associated with a signaling point in the home network; and
  (d) a triggerless number portability process for receiving the first message from the HRN process, analyzing the first message for the presence of one or more number portability status indicators, and determining whether to perform a lookup in the number portability database based on any of the number portability status indicators determined to be present in the first message.

4. A universal triggerless number portability (TNP) routing node comprising:
  (a) a first communication module for receiving a first message from a first end office over a first communications network, the first message including a dialed number, wherein the first communication module is a data communication module implementing the stream control transmission protocol and one or more user adaptation layers for adapting SS7 traffic to a steam control transmission protocol;
  (b) a number portability (NP) database containing routing numbers (RNs) for signaling points serving ported subscribers;
  (c) a home routing number (HRN) process for receiving the first message from the first communication module, determining whether a first routing number (RN) in the first message is associated with a signaling point in a home network, and for forwarding the first message for further number portability processing only if the first RN is associated with a signaling point in the home network; and
  (d) a triggerless number portability process for receiving the first message from the HRN process, analyzing the first message for the presence of one or more number portability status indicators, and determining whether to perform a lookup in the number portability database based on any of the number portability status indicators determined to be present in the first message.

5. The universal TNP routing node of claim 4 wherein the data communication module implements an SS7 MTP level 2 user adaptation layer.

6. The universal TNP routing node of claim 4 wherein the data communication module implements an SS7 MTP level 3 user adaptation layer.

7. The universal TNP routing node of claim 4 wherein the data communication module implements an SS7 SCCP user adaptation layer.

8. The universal TNP routing node of claim 1 wherein the NP database associates dialed numbers in received messages with individual routing numbers of tandem or end offices.

9. The universal TNP routing node of claim 1 wherein the NP database associates individual routing numbers extracted from received messages with blocks or ranges of routing numbers associated with tandem offices or end offices.

10. The universal TNP routing node of claim 1 wherein the home RN process has access to a database of RN values that correspond to signaling points in the home network of the universal TNP routing node.

11. A universal a triggerless number portability (TNP) routing node comprising:
  (a) a first communication module for receiving a first message from a first end office over a first communications network, the first message including a dialed number;
  (b) a number portability (NP) database containing routing numbers (RNs) for signaling points serving ported subscribers;
  (c) a home routing number (HRN) process for receiving the first message from the first communication module, determining whether a first routing number (RN) in the first message is associated with a signaling point in a home network, and for forwarding the first message for further number portability processing only if the first RN is associated with a signaling point in the home network; and
  (d) a triggerless number portability process for receiving the first message from the HRN process, analyzing the first message for the presence of one or more number portability status indicators, and determining whether to perform a lookup in the number portability database based on any of the number portability status indicators determined to be present in the first message, wherein, in response to determining to perform the lookup in the number portability database, the triggerless number portability process is adapted to perform the lookup based on the called party dialed number and to modify the first message to include a second routing number extracted from the number portability database instead of the first routing number.

12. The universal TNP routing node of claim 11 wherein the triggerless number portability process is adapted to modify any of the number portability status indicators determined to be present in the first message after performing the lookup in the number portability database.

13. The universal TNP routing node of claim 11 wherein the triggerless number portability process is adapted to modify the first message to include the second RN by attaching the second RN to the called party dialed number in the called party address of the first message.

14. The universal TNP routing node of claim 11 wherein the triggerless number portability process is adapted to examine a carrier selection parameter in the first message to determine whether carrier selection is invoked for the message as a condition to performing the lookup in the number portability database.

15. The universal TNP routing node of claim 14 wherein, in response to determining that a carrier selection parameter is present in the first message, the triggerless number portability process is adapted to determine whether a carrier ID in the first message corresponds to the service provider that owns the universal TNP routing node.

16. The universal TNP routing node of claim 15 wherein the triggerless number portability process performs the number portability database lookup only in response to determining that the carrier ID corresponds to the service provider that owns the universal triggerless number portability routing node.

17. The universal TNP routing node of claim 14 wherein the triggerless number portability process routes the first message without modification to its original destination in response to determining that the carrier ID does not correspond to the service provider that owns the universal triggerless number portability routing node.

18. A universal triggerless number portability (TNP) routing node comprising:
   (a) a first communication module for receiving a first message from a first end office over a first communications network, the first message including a dialed number;
   (b) a number portability (NP) database containing routing numbers (RNs) for signaling points serving ported subscribers;
   (c) a home routing number (HRN) process for receiving the first message from the first communication module, determining whether a first routing number (RN) in the first message is associated with a signaling point in a home network, and for forwarding the first message for further number portability processing only if the first RN is associated with a signaling point in the home network; and
   (d) a triggerless number portability process for receiving the first message from the HRN process, analyzing the first message to determine whether a number portability translation has already been performed for the first message, and, in response to determining that a number portability translation has already been performed for the first message, performing another number portability translation for the first message.

19. The universal TNP routing node of claim 1 wherein the first parameter includes a number portability forward information (NPFI) parameter, and in response to determining that the NPFI parameter is present in the first message, the triggerless number portability process is adapted to determine to perform the number portability lookup if the NPFI parameter indicates that the dialed number in the first message has been ported or that a number portability lookup has not been performed for the first message.

20. The universal TNP routing node of claim 1 wherein the triggerless number portability process is adapted to determine to perform the number portability database lookup only in response to determining that a number portability status indicator present in the first message indicates at least one of:
   (a) that the number has been ported, and
   (b) that a number portability database lookup has not been performed for the first message.

21. The universal TNP routing node of claim 1 wherein the second parameter includes a nature of address parameter and the tiggerless number portability process is adapted to determine whether predetermined number portability status indicator values are present in the nature of address parameter.

22. The universal TNP routing node of claim 21 wherein, in response to determining that a predetermined number portability status indicator value is present for the NOA parameter in the first message, the triggerless number portability process is adapted to perform the lookup in the number portability database if the NOA parameter indicates that the called party number has been ported.

23. The universal TNP routing node of claim 1 wherein if no number portability status can be determined for the first message, then the triggerless number portability process is adapted to determine to perform a number portability database lookup by default.

24. The universal TNP routing node of claim 1 wherein if no number portability status can be determined for the first message, then the triggerless number portability process is adapted to route the first message to its destination without modification.

25. The universal TNP routing node of claim 1 wherein the triggerless number portability process is adapted to route the first message to another node without performing a lookup in the number portability database if the home RN process determines that the first RN corresponds to a node in a non-home network.

26. The universal TNP routing node of claim 14 wherein the second RN corresponds to a tandem gateway serving a plurality of end offices.

27. The universal TNP routing node of claim 14 wherein the second RN corresponds to an end office (EO).

28. The universal TNP routing node of claim 14 wherein the second RN corresponds to a mobile switching center (MSC).

29. The universal TNP routing node of claim 1 wherein the number portability database is located on a second communication module within the same housing as the first communication module.

30. The universal TNP routing node of claim 1 wherein the number portability database is located on a second communication module located in a different housing from the first communication module.

31. The universal triggerless number portability (TNP) routing node comprising:
   (a) first communication module for receiving a first message from a first end office over a first communications network, the first message including a dialed number;
   (b) a number portability (NP) database containing routing numbers (RNs) for signaling points serving ported subscribers;
   (c) a home routing number (HRN) process for receiving the first message from the first communication module, determining whether a first routing number (RN) in the first message is associated with a signaling point in a home network, and for forwarding the first message for further number portability processing only if the first RN is associated with a signaling point in the home network; and
   (d) a triggerless number portability process for receiving the first message from the HRN process, analyzing the first message for the presence of one or more number portability status indicators, and determining whether to perform a lookup in the number portability database based on any of the number portability status indicators determined to be present in the first message; and
   (e) a gateway screening process for determining whether the first message is a call setup message to specific network nodes and whether the first message is a call setup message from specific network nodes by examining at least one of a service indicator octet (SIO) parameter, an originating point code (OPC) parameter, and a destination point code (DPC) parameter contained within the first message.

32. A routing node capable of performing number portability processing for call setup messages including a variety of different number portability status indicators, the routing node comprising:
   (a) a first communication module for receiving call setup messages including a variety of different number portability status indicators; and (b) a second communication module for receiving the call setup messages from the first communication module, analyzing the number portability status indicators, and for determining whether a number portability database lookup is required based on the number portability status indicators.

33. A routing node capable of performing number portability processing for call setup messages including a variety of different number portability status indicators, the routing node comprising:

(a) a first communication module for receiving call setup messages including a variety of different number portability status indicators; and (b) a second communication module for receiving the call setup messages from the first communication module, analyzing the number portability status indicators, and for determining whether a number portability database lookup is required based on the number portability status indicators, wherein the second communication module is adapted to analyze the call setup messages for the presence of number portability status indicators in all of the following fields present in the call setup messages: the nature of address indicator, the routing number, and the number portability forward information parameter.

34. A method for use in a universal triggerless number portability (TNP) routing node for processing call signaling messages associated with ported subscribers, the method comprising:

(a) receiving a first call setup message including a dialed number;

(b) determining whether a first routing number (RN) is contained in the first call setup message, and in response to determining that the first routing number is contained within the first call setup message, determining whether the first RN is a home RN;

(c) in response to determining that the first RN is a home RN, performing a lookup in a number portability (NP) database based on the dialed number;

(d) extracting, from the number portability database, a second RN for a signaling point identified by the dialed number;

(e) modifying the first call setup message to include the second routing number in lieu of the first routing number; and (f) routing the first call setup message to the signaling point.

35. The method of claim 34 wherein receiving a first call setup message includes receiving an ISDN user part initial address message (ISUP IAM).

36. The method of claim 34 wherein receiving a first call setup message includes receiving a session initiation protocol (SIP) INVITE message.

37. The method of claim 34 wherein determining whether a first RN is a home RN includes performing a lookup in a home RN database resident within the universal TNP routing node.

38. The method of claim 34 wherein determining whether a first RN is a home RN includes performing a lookup in a home RN database external to the universal TNP routing node.

39. The method of claim 34 wherein performing a lookup in an NP database includes performing a lookup in an NP database resident within the universal TNP routing node.

40. The method of claim 34 wherein performing a lookup in an NP database includes performing a lookup in an NP database external to the universal TNP routing node.

41. The method of claim 34 wherein modifying the message to include the second RN includes pre-pending the second RN to the first RN.

42. The method of claim 34 comprising determining whether the first call setup message includes carrier selection information.

43. The method of claim 42 comprising, in response to determining that the first call setup message includes carrier selection information, determining whether the carrier selection information indicates that the first call setup message is to be processed by a carrier that owns the universal TNP routing node.

44. The method of claim 43 wherein performing the lookup in the number portability database comprises performing the lookup in response to determining that the carrier selection indicates that the first call setup message is to be processed by the carrier that owns the universal TNP routing node.

45. The method of claim 43 wherein the number portability process routes the first call setup message without modification to its original destination in response to determining that the carrier ID does not correspond to the service provider that owns the universal triggerless number portability routing node.

46. The method of claim 34 wherein the first RN is associated with a tandem office (TO).

47. The method of claim 34 wherein the second RN is associated with an end office (EO).

48. The method of claim 34 wherein the second RN is associated with a mobile switching center (MSC).

49. A method for number portability processing, the method comprising:

(a) receiving a call setup message including a dialed number and a routing number for a tandem gateway in a called party address field of the call setup message;

(b) analyzing the call setup message to determine whether number portability processing is required for the first message;

(c) in response to determining that number portability processing is required for the call setup message, performing a lookup in a number portability database based on the dialed number and returning a routing number corresponding to an end office or mobile switching center (MSC);

(d) replacing the routing number of the tandem gateway in the called party address field with the routing number of the end office or MSC; and (e) relaying the call setup message to the tandem gateway.

50. The method of claim 49 comprising, at the tandem gateway, receiving the call setup message and routing the call setup message to an end office corresponding to which a subscriber has been ported.

51. The method of claim 1 wherein the first parameter includes a number portability forward information (NPFI) parameter and the second parameter includes a nature of address (NOA) parameter storing number portability status information.

* * * * *